(12) United States Patent
Mente

(10) Patent No.: US 10,669,424 B2
(45) Date of Patent: *Jun. 2, 2020

(54) LIGNOCELLULOSIC COMPOSITE ARTICLES

(71) Applicant: BASF SE, Ludwigshafen am Rhein (DE)

(72) Inventor: Donald C. Mente, Gross Ile, MI (US)

(73) Assignee: BASF SE, Ludwigshafen am Rhein (DE)

( * ) Notice: Subject to any disclaimer, the term of this patent is extended or adjusted under 35 U.S.C. 154(b) by 47 days.

This patent is subject to a terminal disclaimer.

(21) Appl. No.: 15/890,944

(22) Filed: Feb. 7, 2018

(65) Prior Publication Data

US 2018/0312696 A1 Nov. 1, 2018

Related U.S. Application Data

(63) Continuation of application No. 15/024,868, filed as application No. PCT/US2014/057716 on Sep. 26, 2014, now Pat. No. 9,920,202.

(Continued)

(51) Int. Cl.
*C08L 97/02* (2006.01)
*C09J 175/04* (2006.01)
(Continued)

(52) U.S. Cl.
CPC .............. *C08L 97/02* (2013.01); *B27N 3/002* (2013.01); *B27N 3/02* (2013.01); *C08G 18/305* (2013.01);
(Continued)

(58) Field of Classification Search
CPC .......... C08L 97/02; C08K 5/521; C08K 5/523
See application file for complete search history.

(56) References Cited

U.S. PATENT DOCUMENTS 3,451,968 A * 6/1969 Akiyama ............... C08K 5/524
525/509
3,519,581 A 7/1970 Moorer et al.
(Continued)

FOREIGN PATENT DOCUMENTS

| EP | 0460858 A1 * | 12/1991 | ............. C08G 18/70 |
| EP | 0 55 3457 A2 | 8/1993 | |
| GB | 791 851 | 2/1958 | |

OTHER PUBLICATIONS

International Search Report and Written Opinion from corresponding PCT Applicant No. PCT/US2014/057716; dated Feb. 3, 2015.
(Continued)

*Primary Examiner* — Nicholas E Hill
(74) *Attorney, Agent, or Firm* — DLA Piper LLP (US)

(57) ABSTRACT

A lignocellulosic composite article includes a plurality of lignocellulosic pieces and an adhesive system disposed on the plurality of lignocellulosic pieces for bonding the plurality of lignocellulosic pieces. The adhesive system includes a binder component and a compatibilizer component. An example of a suitable binder component is an isocyanate component, e.g. a diphenylmethane diisocyanate (MDI), a polymeric diphenylmethane diisocyanate (pMDI), and combinations thereof. The compatibilizer component includes a trialkyl phosphate. The compatibilizer component is utilized in an amount of at least about 0.5 parts by weight based on 100 parts by weight of the binder component. The compatibilizer component is useful for reducing the amount of press time required during manufacture of the composite article. The adhesive system can include additional components, such as an isocyanate-reactive component. The composite article may be various lignocellulosic composites, such as oriented strand board (OSB), particleboard (PB), fiberboard (e.g. medium density fiberboard; MDF), etc.

8 Claims, 15 Drawing Sheets

Related U.S. Application Data

(60) Provisional application No. 61/884,223, filed on Sep. 30, 2013, provisional application No. 62/032,123, filed on Aug. 1, 2014.

(51) Int. Cl.

| | |
|---|---|
| C08G 18/64 | (2006.01) |
| C08G 18/76 | (2006.01) |
| C08G 18/30 | (2006.01) |
| C08K 5/521 | (2006.01) |
| C08L 75/04 | (2006.01) |
| B27N 3/00 | (2006.01) |
| B27N 3/02 | (2006.01) |
| D21J 1/04 | (2006.01) |

(52) U.S. Cl.
CPC ..... *C08G 18/6492* (2013.01); *C08G 18/7657* (2013.01); *C08G 18/7664* (2013.01); *C08K 5/521* (2013.01); *C08L 75/04* (2013.01); *C09J 175/04* (2013.01); *D21J 1/04* (2013.01); *C08L 2205/08* (2013.01)

(56) References Cited

U.S. PATENT DOCUMENTS

| | | | |
|---|---|---|---|
| 4,257,995 A * | 3/1981 | McLaughlin | C08G 18/302 264/122 |
| 4,257,996 A * | 3/1981 | Farrissey, Jr. | C08L 97/02 264/122 |
| 4,376,089 A * | 3/1983 | Bogner | B27N 3/00 264/109 |
| 4,522,976 A | 6/1985 | Grace et al. | |
| 4,608,407 A * | 8/1986 | Kerimis | C08L 97/02 524/14 |
| 4,742,113 A | 5/1988 | Gismondi et al. | |
| 5,093,412 A | 3/1992 | Mente et al. | |
| 5,128,407 A | 7/1992 | Layton et al. | |
| 5,179,131 A | 1/1993 | Wujcik et al. | |
| 5,223,570 A | 6/1993 | Huang et al. | |
| 5,425,976 A | 6/1995 | Clarke et al. | |
| 5,594,066 A | 1/1997 | Heinemann et al. | |
| 5,750,201 A | 5/1998 | Phanopoulos et al. | |
| 5,814,699 A | 9/1998 | Kratz et al. | |
| 6,034,146 A | 3/2000 | Falke et al. | |
| 6,103,140 A | 8/2000 | Falke et al. | |
| 6,224,800 B1 | 5/2001 | Rosthauser | |
| 6,297,313 B1 | 10/2001 | Hsu | |
| 6,344,165 B1 | 2/2002 | Coleman | |
| 6,352,658 B1 | 3/2002 | Chang et al. | |
| 6,352,661 B1 | 3/2002 | Thompson et al. | |
| 6,432,543 B2 | 8/2002 | Harrison et al. | |
| 6,451,101 B1 | 9/2002 | Mente et al. | |
| 6,458,238 B1 | 10/2002 | Mente et al. | |
| 6,464,820 B2 | 10/2002 | Mente et al. | |
| 6,472,447 B1 | 10/2002 | Lorenz et al. | |
| 6,627,122 B1 | 9/2003 | Tada et al. | |
| 6,638,459 B2 | 10/2003 | Mente et al. | |
| 6,646,820 B1 | 11/2003 | Ishida et al. | |
| 6,649,098 B2 | 11/2003 | Mente et al. | |
| 6,649,107 B2 | 11/2003 | Harrison et al. | |
| 6,846,849 B2 | 1/2005 | Capps | |
| 7,179,882 B2 | 2/2007 | Adkins et al. | |
| 7,422,787 B2 | 9/2008 | Evers et al. | |
| 7,439,280 B2 | 10/2008 | Lu et al. | |
| 8,304,069 B2 | 11/2012 | Gehringer et al. | |
| 8,486,523 B2 | 7/2013 | Mente | |
| 9,822,042 B2 | 11/2017 | Rosenthal et al. | |
| 9,920,202 B2 * | 3/2018 | Mente | C09J 175/04 |
| 2005/0242459 A1 | 11/2005 | Savino et al. | |
| 2006/0065996 A1 | 3/2006 | Kruesemann et al. | |
| 2009/0104458 A1 | 4/2009 | Ryu | |
| 2011/0545055 | 3/2011 | Schmitz et al. | |
| 2011/0139387 A1 * | 6/2011 | Balbo Block | B29C 33/62 162/158 |
| 2011/0189473 A1 * | 8/2011 | Mente | B27N 1/006 428/326 |
| 2013/0019778 A1 | 1/2013 | Moriarty et al. | |

OTHER PUBLICATIONS

Chemical Book, "Triethyl Phospate", downloaded from www.chemicalbook.com/chemicalProductProperty_EN_CB18 on May 24, 2013.

Frihart, Charles R., "Wood Adhesives 2005", Nov. 2-4, 2005, San Diego, CA, Madison, WI: Forest Products Society 2005: ISBN 1892529459, pp. 263-269.

Matweb, "BASF Lupranate M20FB Isocyanate", downloaded from www.matweb.com/search/datasheettext.aspx?matguid_e2abbd on May 27, 2014.

Matweb, "BASF Pluracol 1578 Rigid Polyol", downloaded from www.Matweb.com/search/datasheettext.aspx?matguid_9c969d on May 27, 2014.

Randall, David, et al., "The Polyurethanes Book", John Wiley & Sons Ltd., 2002, pp. 104-105 and pp. 395-408.

Wikipedia, "Triethyl Prosphate", downloaded from http://en.wikipedia.org/wiki/Triethyl_phosphate on May 24, 2013.

* cited by examiner

LIGNOCELLULOSIC COMPOSITE ARTICLES

FIELD OF THE DISCLOSURE

The present disclosure generally relates to lignocellulosic composite articles, and more specifically, to lignocellulosic composite articles including a plurality of lignocellulosic pieces and an adhesive system disposed on the plurality of lignocellulosic pieces, and to methods of forming the lignocellulosic composite articles.

DESCRIPTION OF THE RELATED ART

Lignocellulosic composite articles, such as oriented strand board (OSB), oriented strand lumber (OSL), particleboard (PB), scrimber, agrifiber board, chipboard, flakeboard, and fiberboard, e.g. medium density fiberboard (MDF), are generally produced by blending or spraying lignocellulosic pieces with a binder composition, e.g. a resin, while the lignocellulosic pieces are tumbled or agitated in a blender or similar apparatus. After blending sufficiently to form a binder-lignocellulosic mixture, the lignocellulosic pieces, which are now coated with the binder composition, are formed into a product, specifically a loose mat, which is compressed between heated platens/plates to set the binder composition and to bond the lignocellulosic pieces together in densified form, such as in a board, panel, or other shape. Conventional processes for compressing the loose mat are generally carried out at temperatures of from about 120° C. to about 225° C., in the presence of varying amounts of steam, either purposefully injected into the loose mat or generated by liberation of entrained moisture from the lignocellulosic pieces in the loose mat. These processes also generally require that the moisture content of the lignocellulosic pieces be between about 2% and about 20% by weight, before blending the lignocellulosic pieces with the binder composition.

The lignocellulosic pieces can be in the form of chips, shavings, strands, scrim, wafers, fibers, sawdust, bagasse, straw and wood wool. When the lignocellulosic pieces are relatively larger in size, e.g. from 1 to 7 inches, the lignocellulosic composite articles produced by the process can be called engineered wood. These engineered woods include laminated strand lumber, OSB, OSL, scrimber, parallel strand lumber, and laminated veneer lumber. When the lignocellulosic pieces are relatively smaller, e.g. typical sawdust and refined fiber sizes, the lignocellulosic composite articles are particleboard (PB) and fiberboard, e.g. MDF. Other engineered woods, such as plywood, employ larger sheets of lumber, which are held together by a binder composition in a sandwich configuration. Yet other engineered woods, such as scrimber, employ thin, long, irregular pieces of wood having average diameters ranging from about 2 to 10 mm and lengths several feet in length.

The engineered woods were developed because of the increasing scarcity of suitably sized tree trunks for cutting lumber. Such engineered woods can have advantageous physical properties such as strength and stability. Another advantage of the engineered woods is that they can be made from the waste material generated by processing other wood and lignocellulosic materials. This leads to efficiencies and energy savings from the recycling process, and saves landfill space.

Binder compositions that have been used for making such lignocellulosic composite articles include phenol formaldehyde (PF) resins, urea formaldehyde (UF) resins and isocyanate resins. Binder compositions based on isocyanate chemistry are commercially desirable because they have low water absorption, high adhesive and cohesive strength, flexibility in formulation, versatility with respect to cure temperature and rate, excellent structural properties, the ability to bond with lignocellulosic materials having high water contents, and importantly, zero formaldehyde emissions. Lignocellulosic composite articles utilizing such binder compositions are imparted with corresponding properties/benefits.

Lignocellulosic materials can be treated with polymethylene poly(phenyl isocyanates) (also known as polymeric MDI or pMDI) to improve the strength of the composite article. Typically, such treatment involves applying the isocyanate to the lignocellulosic material and allowing the isocyanate to cure, either by application of heat and pressure or at room temperature. While it is possible to allow the pMDI to cure under ambient conditions, residual isocyanate (NCO) groups remain on the treated articles for weeks or even months in some instances. Toluene diisocyanate (TDI) can also be utilized for such purposes, but is generally less acceptable from an environmental standpoint. Isocyanate prepolymers are among the preferred isocyanate materials that have been used in binder compositions to solve various processing problems, particularly, in reducing adhesion to press platens and for reducing reactivity of the isocyanates.

Unfortunately, disadvantages of using isocyanates in place of PF and/or UF resins include difficulty in processing due to adhesion to platens, lack of tack or cold-tack (i.e., the isocyanates are not "tacky" or "sticky"), and the need for special storage in certain scenarios. In addition, isocyanates can also have extended cure times, which reduces manufacturing output of composite articles utilizing the same. Further, some isocyanates and related components can have too high of viscosities, which impairs handling of the same, and increases cost of manufacture of composite articles utilizing such components.

Accordingly, there remains an opportunity to provide improved adhesive systems useful for forming lignocellulosic composite articles. There also remains an opportunity to provide improved lignocellulosic composite articles and improved methods of forming such lignocellulosic composite articles.

SUMMARY OF THE DISCLOSURE AND ADVANTAGES

A lignocellulosic composite article ("the article") includes a plurality of lignocellulosic pieces and an adhesive system disposed on the plurality of lignocellulosic pieces for bonding the plurality of lignocellulosic pieces. The adhesive system includes a binder component and a compatibilizer component. In certain embodiments, the binder component includes an isocyanate component. The compatibilizer component includes a trialkyl phosphate (TAP). The compatibilizer component is utilized in an amount of at least about 0.5 parts by weight based on 100 parts by weight of the binder component. A method of forming the article includes the step of applying the binder component and the compatibilizer component to the plurality of lignocellulosic pieces. The method further includes the step of disposing the plurality of lignocellulosic pieces having the binder component and the compatibilizer component applied thereon on a carrier to form a mass. The method further includes the step of applying pressure and/or heat to the mass for an amount of time sufficient to form the article.

Without being bound or limited to any particular theory, it is thought that presence of the compatibilizer component reduces the amount of time required to form the article relative to the amount of time required when the compatibilizer component is not utilized to form the article. Specifically, it is thought that the compatibilizer component is useful for reducing cure time of the adhesive system during manufacture of the article. As such, throughput of the articles can be increased via increased manufacturing speeds, e.g. press speeds (i.e., shorter pressing times). Other manufacturing benefits can also be realized, such as improved application of the components of the adhesive system to the plurality of lignocellulosic pieces relative to conventional adhesives. In addition, it is believed that the disclosure articles include excellent physical properties. For example, in certain embodiments, the articles can have one or more of the following: increased bond strength, reduced edge swelling, improved release properties, improved flexural modulus, and/or reduced emissions, each relative to conventional articles. It is thought that other potential advantages afforded by the use of the compatibilizer component are: improved plasticization of the lignocellulosic pieces; reduced binder component viscosity leading to improved distribution on the lignocellulosic pieces; and improved flame test performance of the articles. It is thought that the compatibilizer component can also improve the performance of other, optional, components utilized to form the articles, such as polyols through phase transfer catalysis and/or viscosity reducing mechanisms.

BRIEF DESCRIPTION OF THE DRAWINGS

Other advantages of the present disclosure will be readily appreciated, as the same becomes better understood by reference to the following detailed description when considered in connection with the accompanying drawing(s) wherein.

DETAILED DESCRIPTION OF THE DISCLOSURE

Figure 1:
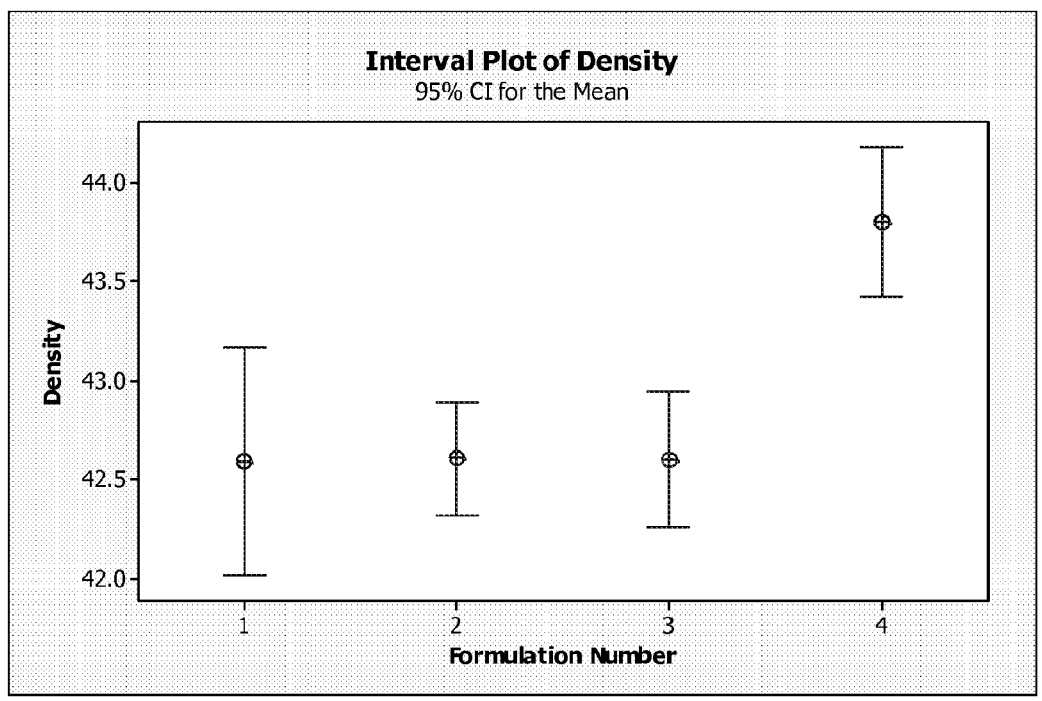
FIG. 1 is an interval plot illustrating density of lignocellulosic composite articles described in the Examples section.
Figure 2:
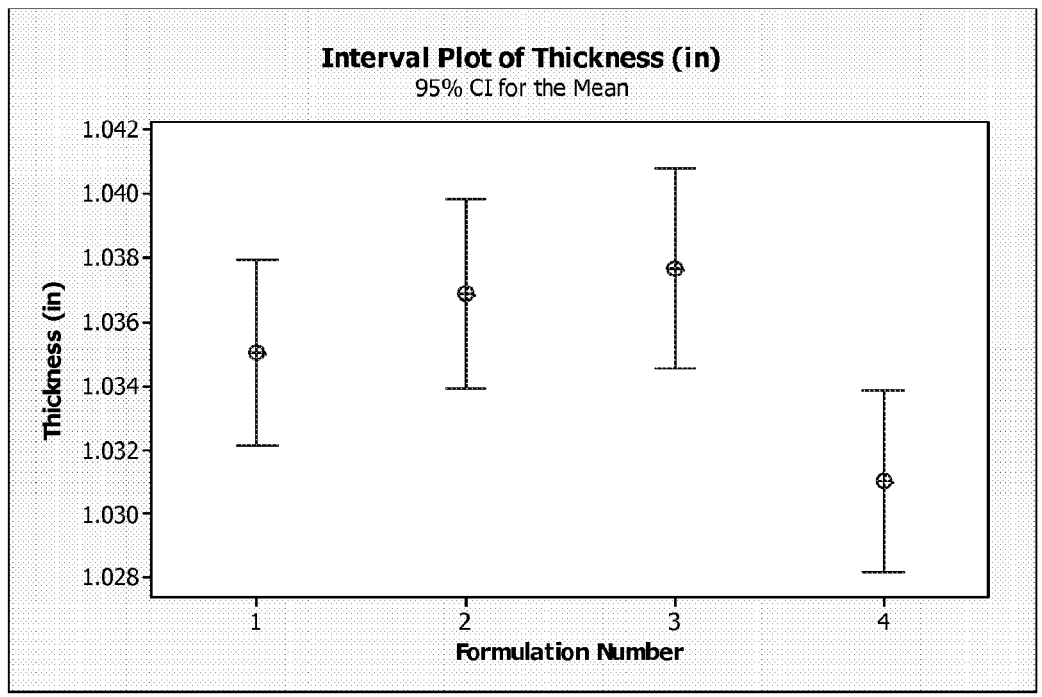
FIG. 2 is an interval plot illustrating thickness (inches) of lignocellulosic composite articles described in the Examples section.
Figure 3:
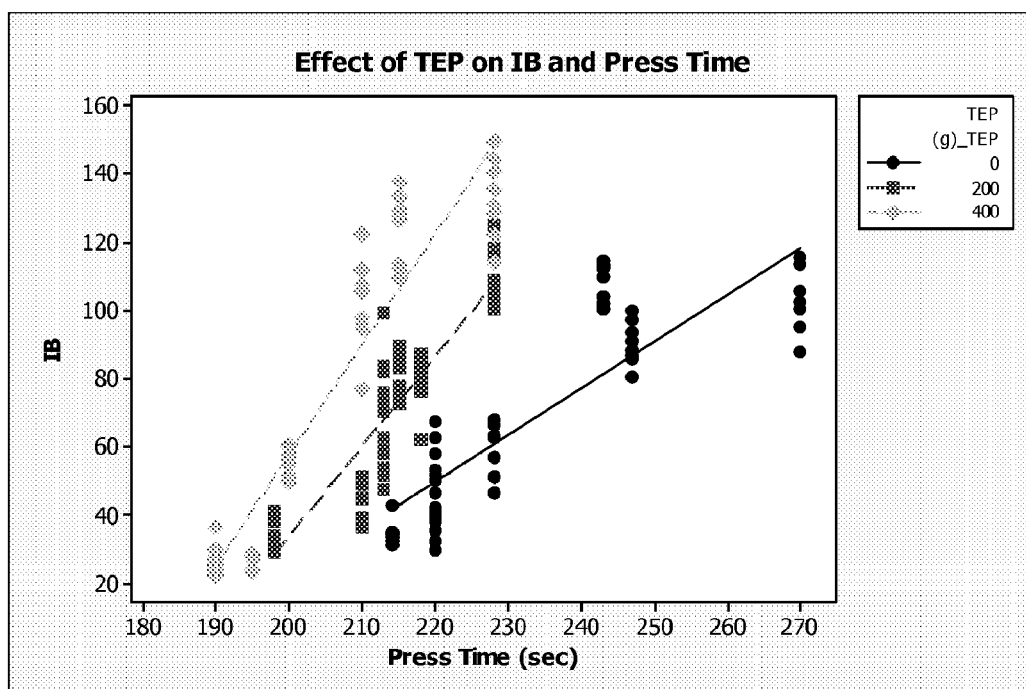
FIG. 3 is a plot illustrating internal bond (IB) strength (psi) and press time (seconds) of lignocellulosic composite articles described in the Examples section.
Figure 4:
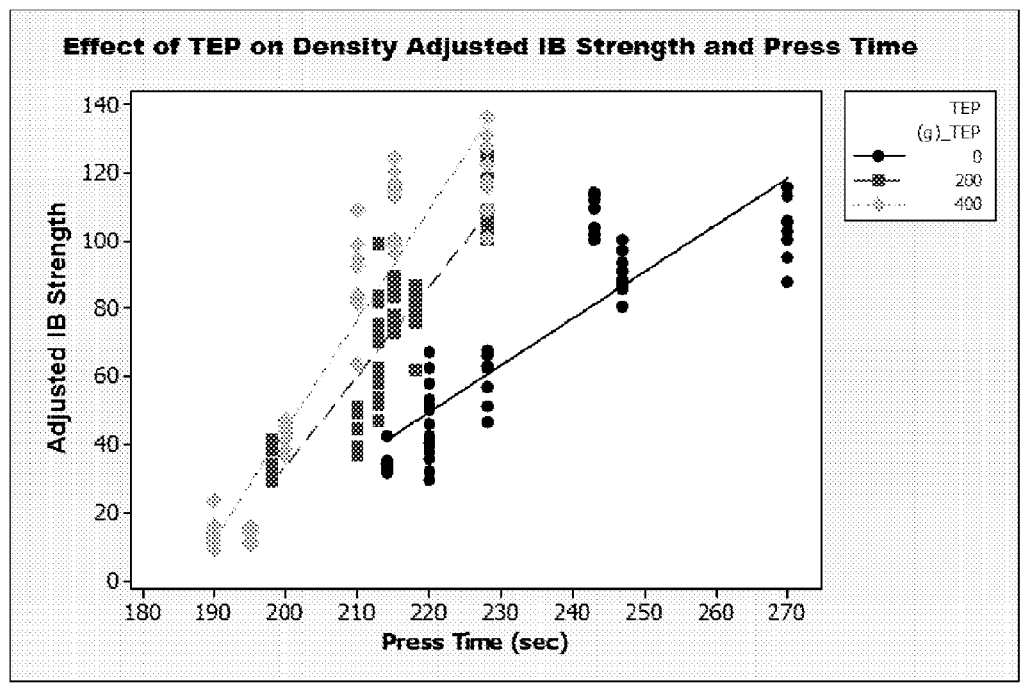
FIG. 4 is a plot illustrating density adjusted IB strength (psi) and press time (seconds) of lignocellulosic composite articles described in the Examples section.
Figure 5:
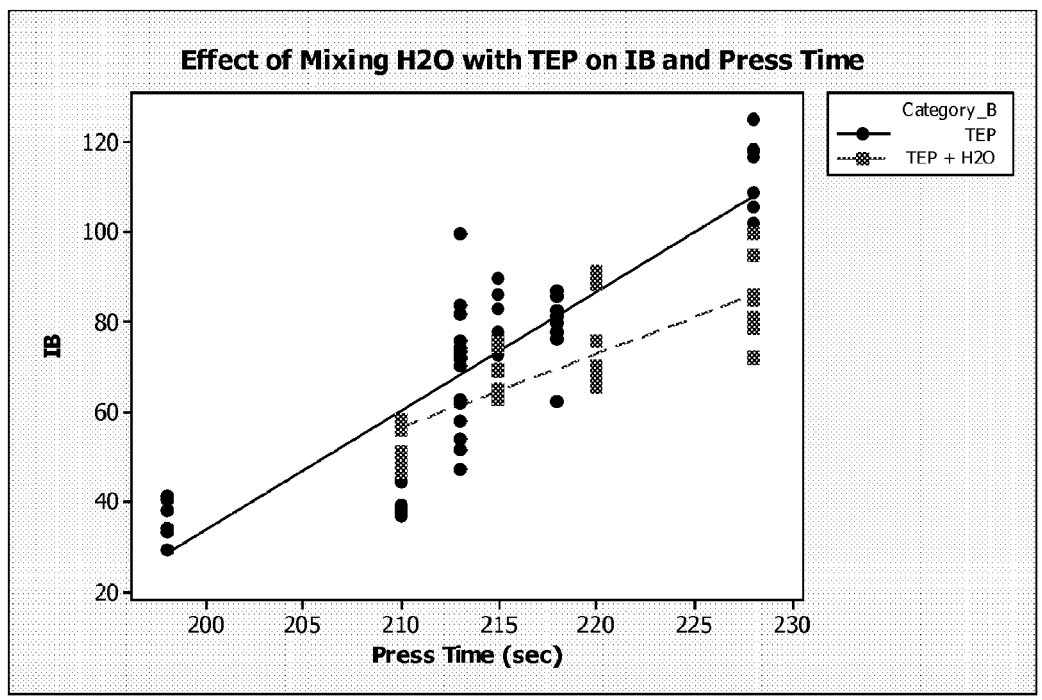
FIG. 5 is a plot illustrating IB strength (psi) and press time (seconds) of lignocellulosic composite articles described in the Examples section.

A lignocellulosic composite article (the "article") is disclosed herein. The article can be used for various applications. Examples of such applications include, but are not limited to, for packaging; for furniture and cabinetry; for roof and floor sheathing; for roof, floor, and siding paneling; for window and door frames; and for webstock, e.g. webstock for engineered I-beams.

The article, in various embodiments, can be referred to as various forms of engineered lignocellulosic composites, e.g., as engineered wood composites, such as oriented strand board (OSB); oriented strand lumber (OSL); scrimber; fiberboard, such as low density fiberboard (LDF), medium density fiberboard (MDF), and high density fiberboard (HDF); chipboard; flakeboard or flake board; particleboard (PB); plywood; etc. Generally, the article is in the form OSB, OSL, PB, scrimber, plywood, LDF, MDF, or HDF, more typically in the form of PB, MDF, HDF, or OSB; however, it is to be appreciated that the article may be in other engineered wood forms, such as, but not limited to, those described and exemplified herein. It is to be appreciated that the names of lignocellulosic composite articles are often used interchangeably in the art. For example, one may refer to a composite as OSB whereas another may refer to the same composite as flake board.

The article includes a plurality of lignocellulosic pieces. The lignocellulosic pieces can be derived from a variety of lignocellulosic materials. Generally, the lignocellulosic pieces are derived from wood; however, the lignocellulosic pieces can be derived from other lignocellulosic materials, such as from bagasse, straw, flax residue, nut shells, cereal grain hulls, etc., and mixtures thereof. If wood is utilized as the lignocellulosic material, the lignocellulosic pieces can be prepared from various species of hardwoods and/or softwoods. Non-lignocellulosic materials in flake, fibrous or other particulate form, such as glass fiber, mica, asbestos, rubber, plastics, etc., can also be mixed with the lignocellulosic material; however, such materials are not generally required.

The lignocellulosic pieces can come from a variety of processes, such as by comminuting small logs, industrial wood residue, branches, rough pulpwood, etc. into pieces in the form of sawdust, chips, flakes, wafer, strands, scrim, fibers, sheets, etc. In certain embodiments, the lignocellulosic pieces include those pieces typically utilized for forming OSB, OSL, scrimber, and particleboards (PB). In other embodiments, the lignocellulosic pieces include those pieces typically utilized for forming fiberboards, such as LDF, MDF, and HDF. In yet another embodiment the lignocellulosic pieces include those pieces typically utilized for forming plywood. It is to be appreciated that the article can include various combinations of the aforementioned materials and/or pieces, such as strands and sawdust. In addition, the article may be formed into shapes other than panels and boards.

The lignocellulosic pieces can be produced by various conventional techniques. For example, pulpwood grade logs can be converted into flakes in one operation with a conventional roundwood flaker. Alternatively, logs and logging residue can be cut into fingerlings on the order of from about 0.5 to about 3.5 inches long with a conventional apparatus, and the fingerlings flaked in a conventional ring type flaker. The logs are typically debarked before flaking. The article is not limited to any particular method of forming the lignocellulosic pieces.

The dimensions of the lignocellulosic pieces are not particularly critical. In certain embodiments, such as those used to form OSB, the lignocellulosic pieces typically include strands having an average length of from about 2.5 to about 6 inches, an average width of from about 0.5 to about 2 inches, and an average thickness of from about 0.1 to about 0.5 inches. It is to be appreciated that other sizes can also be utilized, as desired by one skilled in the art. In some of these embodiments, the article may include other types of lignocellulosic pieces, such as chips, in addition to the strands. In certain embodiments, strands which are typically about 1.5 inches wide and about 12 inches long can be used to make laminated strand lumber, while strands typically about 0.12 inches wide and about 9.8 inches long can be used to make parallel strand lumber. In certain embodiments, such as those used to form flakeboard, the lignocellulosic pieces include flakes having an average length of from about 2 to about 6 inches, an average width of about 0.25 to about 3 inches, and an average thickness of from about 0.005 to about 0.05 inches. In other embodiments, such as those used to from scrimber, the lignocellulosic pieces include thin, irregular pieces having average diameters ranging from about 0.25 to about 20, about 0.5 to about 15, or about 1 to about 10, mm, and lengths ranging from several inches to several feet in length. Detailed information on suitable sizes and shapes of lignocellulosic pieces, e.g., scrim, as well as methods of manufacturing scrimber, is described in U.S. Pat. No. 6,344,165 to Coleman, the disclosure of which is incorporated herein by reference in its entirety. In yet other embodiments, the lignocellulosic pieces are those typically used to form conventional PB. The lignocellulosic pieces can be further milled prior to use, if such is desired to produce a size more suitable for producing a desired article. For example, hammer, wing beater, and toothed disk mills may be used for forming lignocellulosic pieces of various sizes and shapes.

The lignocellulosic pieces can have various moisture contents, where if present, water can serve as an isocyanate-reactive component, which is described further below. Typically, the lignocellulosic pieces have a moisture content of from about 1 to about 20, about 2 to about 15, about 3 to about 12, or about 5 to about 10, parts by weight (water), based on 100 parts by weight of the lignocellulosic pieces, or any subrange in between. If present in (and/or on) the lignocellulosic pieces, the water assists in the curing or setting of the article. It is to be appreciated that the lignocellulosic pieces can have inherent moisture content; or alternatively, water may be added to or removed from the lignocellulosic pieces, such as by wetting or drying the lignocellulosic pieces, respectively, to obtain a desired moisture content of the lignocellulosic pieces prior to and/or during formation of the article.

The lignocellulosic pieces are utilized in the article in various amounts, depending on the type of article desired to be formed. Typically, such as in OSB, PB, scrimber, or MDF applications, the lignocellulosic pieces are utilized in an amount of from about 75 to about 99, about 85 to about 98, about 90 to about 97, or about 92 to about 95.5, parts by weight, based on 100 parts by weight of the article, or any subrange in between. It is to be appreciated that the amounts can be higher or lower depending on various factors, including moisture content of the lignocellulosic pieces. For example, moisture content of the lignocellulosic pieces can vary by geographic location, source, etc., such as variations from mill to mill.

The article further includes an adhesive system. In certain embodiments, the article includes the lignocellulosic pieces and the adhesive system. In further embodiments, the article consists essentially of the lignocellulosic pieces and the adhesive system. In yet further embodiments, the article consists of the lignocellulosic pieces and the adhesive system. In other related embodiments, the article further includes an additive component.

The adhesive system is disposed on the lignocellulosic pieces for bonding the lignocellulosic pieces. By "disposed on", it is meant that the adhesive system is in contact with at least a portion of the lignocellulosic pieces. The adhesive system includes a binder component and a compatibilizer component. The adhesive system may include one or more additional components, as described below. The adhesive is generally formed from the binder component and the compatibilizer component. It is to be appreciated that in many embodiments, the binder component reacts (e.g. with water, itself, and/or another component), such that it may only exist for a period of time during formation of the article. For example, most to all of the binder component may be reacted during formation of the article such that little to no binder component remains in the article after formation. In other embodiments, some amount of the binder component may be present in the article after formation.

The binder component is typically chosen from an isocyanate component, a formaldehyde resin, a protein-based adhesive, or a combination thereof. If utilized, the isocyanate component is typically a polymeric diphenylmethane diisocyanate (pMDI); however, other isocyanates can also be utilized as described below. If utilized, the formaldehyde resin is typically a urea formaldehyde (UF) resin or a melamine UF resin, however, other formaldehydes can also be used, e.g. a phenol formaldehyde (PF) resin. If utilized, the protein-based adhesive is typically a soy-based adhesive, however, other protein-based adhesives can also be utilized, e.g. a casein-based adhesive.

In general, the binder component is only present for some amount of time prior to a reaction product thereof curing to a final cured state to form the adhesive system, and therefore, the article. In other words, the reaction product is generally the final cured state of the adhesive system, after reaction occurs between the components used to form the article, e.g. after reaction between the isocyanate component and an isocyanate-reactive component (described below).

Components of the adhesive can be premixed or combined to form the adhesive system and then the adhesive system can be applied to the lignocellulosic pieces. In certain embodiments, the binder component, the compatibilizer component, and optionally, one or more additional components, are individually applied to the lignocellulosic pieces, and/or already present thereon, during formation of the article, rather then being premixed and applied, all of which is further described below. In other embodiments, two or more of the components are premixed and applied, e.g. the binder and compatibilizer components, the compatibilizer and isocyanate-reactive components, etc.

The binder component generally adheres the lignocellulosic pieces to one another, once cured. For example, the reaction product of the isocyanate component and the isocyanate-reactive component can bond the lignocellulosic pieces via linkages, e.g. urea linkages. The compatibilizer component is generally inert such that it is not part of the reaction product (albeit it may be present therein). General mechanisms of adhesion, for wood composites, are detailed in pages 397 through 399 of THE POLYURETHANES HANDBOOK (David Randall & Steve Lee eds., John Wiley & Sons, Ltd. 2002), the disclosure of which is incorporated herein by reference in its entirety in various non-limiting embodiments.

In a first embodiment of the binder component, the adhesive system includes the reaction product of the isocyanate component and the isocyanate-reactive component reactive with the isocyanate component. The isocyanate component is typically a polyisocyanate having two or more functional groups, e.g. two or more isocyanate (NCO) groups. Said another way, the isocyanate component can just be an isocyanate or a combination of isocyanates. Suitable organic polyisocyanates include, but are not limited to, conventional aliphatic, cycloaliphatic, araliphatic and aromatic isocyanates. In certain embodiments, the isocyanate component is chosen from diphenylmethane diisocyanates (MDIs), polymeric diphenylmethane diisocyanates (pMDIs), and combinations thereof. Polymeric diphenylmethane diisocyanates can also be called polymethylene polyphenylene polyisocyanates. In other embodiments, the isocyanate component is an emulsifiable MDI (eMDI). Examples of other suitable isocyanates include, but are not limited to, toluene diisocyanates (TDIs), hexamethylene diisocyanates (HDIs), isophorone diisocyanates (IPDIs), naphthalene diisocyanates (NDIs), and combinations thereof. In a specific embodiment, the isocyanate component is MDI. In another specific embodiment, the isocyanate component is pMDI. In further specific embodiments, the isocyanate component is a combination of MDI and pMDI.

In certain embodiments, the isocyanate component is an isocyanate-terminated prepolymer. The isocyanate-terminated prepolymer is a reaction product of an isocyanate and a polyol and/or a polyamine. The isocyanate may be any type of isocyanate in the polyurethane art, such as one of the polyisocyanates. If utilized to make the isocyanate-terminated prepolymer, the polyol is typically chosen from ethylene glycol, diethylene glycol, propylene glycol, dipropylene glycol, butane diol, glycerol, trimethylolpropane, triethanolamine, pentaerythritol, sorbitol, and combinations thereof. The polyol may also be a polyol as described and exemplified further below with discussion of the isocyanate-reactive component. If utilized to make the isocyanate-terminated prepolymer, the polyamine is typically chosen from ethylene diamine, toluene diamine, diaminodiphenylmethane and polymethylene polyphenylene polyamines, aminoalcohols, and combinations thereof. Examples of suitable aminoalcohols include ethanolamine, diethanolamine, triethanolamine, and combinations thereof. The isocyanate-terminated prepolymer may be formed from a combination of two or more of the aforementioned polyols and/or polyamines.

The isocyanates or isocyanate-terminated prepolymers may also be used in the form of an aqueous emulsion by mixing such materials with water in the presence of an emulsifying agent. The isocyanate component may also be a modified isocyanate, such as, carbodiimides, allophanates, isocyanurates, and biurets.

Other suitable isocyanates include those described in U.S. Pat. No. 4,742,113 to Gismondi et al.; U.S. Pat. No. 5,093,412 to Mente et al.; U.S. Pat. No. 5,425,976 to Clarke et al.; U.S. Pat. No. 6,297,313 to Hsu; U.S. Pat. No. 6,352,661 to Thompson et al.; U.S. Pat. No. 6,451,101 to Mente et al.; U.S. Pat. No. 6,458,238 to Mente et al.; U.S. Pat. No. 6,464,820 to Mente et al.; U.S. Pat. No. 6,638,459 to Mente et al.; U.S. Pat. No. 6,649,098 to Mente et al.; U.S. Pat. No. 6,822,042 to Capps; U.S. Pat. No. 6,846,849 to Capps; U.S. Pat. No. 7,422,787 to Evers et al.; U.S. Pat. No. 7,439,280 to Lu et al.; and U.S. Pat. No. 8,486,523 to Mente; and U.S. Publication No. 2005/0242459 to Savino et al.; the disclosures of which are incorporated herein by reference in their entirety in various non-limiting embodiments.

Specific examples of suitable isocyanate components are commercially available from BASF Corporation of Florham Park, N.J., under the trademark LUPRANATE®, such as LUPRANATE® M, LUPRANATE® M20, LUPRANATE® MI, LUPRANATE® M20SB, LUPRANATE® M20HB, and LUPRANATE® M20FB isocyanates. In one embodiment, the isocyanate component is LUPRANATE® M20. In another embodiment, the isocyanate component is LUPRANATE® M20FB. It is to be appreciated that the isocyanate component may include any combination of the aforementioned isocyanates and/or isocyanate-terminated prepolymers.

If utilized, the isocyanate component typically has a viscosity which is suitable for specific applications of the isocyanate component to the lignocellulosic pieces, such as by spraying, fogging and/or atomizing the isocyanate component to apply the isocyanate component to the lignocellulosic pieces. Typically, the isocyanate component has a viscosity of from about 100 to about 5,000, about 100 to about 2,500, or about 100 to about 1,000, cps at 25° C. according to ASTM D2196, or any subrange in between. Regardless of the application technique, the viscosity of the isocyanate component should be sufficient to adequately coat the lignocellulosic pieces.

The adhesive system can include the reaction product of the isocyanate component and the isocyanate-reactive component. In one embodiment, the isocyanate-reactive component is water, which may be applied to and/or already present on the lignocellulosic pieces, e.g. as a preexisting moisture content (or a portion thereof). In other embodiments, the isocyanate-reactive component includes a polyol and/or a polyamine. In certain embodiments, the isocyanate-reactive component includes a polymer polyol, which may also be referred to as a graft polyol. The isocyanate-reactive component can include a combination of the aforementioned isocyanate-reactive components, e.g. water and a polyol.

Typically, such as in OSB, PB, scrimber, or MDF applications, the isocyanate-reactive component is utilized in an amount of from about 1 to about 20, about 1 to about 15, or about 2 to about 10, parts by weight, based on 100 parts by weight of lignocellulosic pieces, or any subrange in between. The amounts described herein are generally based on the assumption that the lignocellulosic pieces are completely dry to account for variations in moisture contents of the lignocellulosic pieces. More specific amounts are described below. If water is utilized at the isocyanate-reactive component, it can be present in these amounts or in the amounts regarding moisture content of the lignocellulosic pieces.

If utilized, the polyol is typically chosen from conventional polyols, such as ethylene glycol, diethylene glycol, propylene glycol, dipropylene glycol, butane diol, glycerol, trimethylolpropane, triethanolamine, pentaerythritol, sorbitol, and combinations thereof. Other suitable polyols include, but are not limited to, biopolyols, such as soybean oil, castor-oil, soy-protein, rapeseed oil, etc., and combinations thereof. It is believed that certain polyols impart plasticization and/or film formation, and tackiness, which may increase with pressure. For example, some polyols may act as a plasticizer, especially in conjunction with the compatibilizer component.

Suitable polyether polyols include, but are not limited to, products obtained by the polymerization of a cyclic oxide, for example ethylene oxide (EO), propylene oxide (PO), butylene oxide (BO), or tetrahydrofuran in the presence of polyfunctional initiators. Suitable initiator compounds contain a plurality of active hydrogen atoms, and include water, butanediol, ethylene glycol, propylene glycol (PG), diethylene glycol, triethylene glycol, dipropylene glycol, ethanolamine, diethanolamine, triethanolamine, toluene diamine, diethyl toluene diamine, phenyl diamine, diphenylmethane diamine, ethylene diamine, cyclohexane diamine, cyclohexane dimethanol, resorcinol, bisphenol A, glycerol, trimethylolpropane, 1,2,6-hexanetriol, pentaerythritol, and combinations thereof.

Other suitable polyether polyols include polyether diols and triols, such as polyoxypropylene diols and triols and poly(oxyethylene-oxypropylene)diols and triols obtained by the simultaneous or sequential addition of ethylene and propylene oxides to di- or trifunctional initiators. Copolymers having oxyethylene contents of from about 5 to about 90% by weight, based on the weight of the polyol component, of which the polyols may be block copolymers, random/block copolymers or random copolymers, can also be used. Yet other suitable polyether polyols include polytetramethylene glycols obtained by the polymerization of tetrahydrofuran.

Suitable polyester polyols include, but are not limited to, hydroxyl-terminated reaction products of polyhydric alcohols, such as ethylene glycol, propylene glycol, diethylene glycol, 1,4-butanediol, neopentylglycol, 1,6-hexanediol, cyclohexane dimethanol, glycerol, trimethylolpropane, pentaerythritol or polyether polyols or mixtures of such polyhydric alcohols, and polycarboxylic acids, especially dicarboxylic acids or their ester-forming derivatives, for example succinic, glutaric and adipic acids or their dimethyl esters sebacic acid, phthalic anhydride, tetrachlorophthalic anhydride or dimethyl terephthalate or mixtures thereof. Polyester polyols obtained by the polymerization of lactones, e.g. caprolactone, in conjunction with a polyol, or of hydroxy carboxylic acids, e.g. hydroxy caproic acid, may also be used.

Suitable polyesteramides polyols may be obtained by the inclusion of aminoalcohols such as ethanolamine in polyesterification mixtures. Suitable polythioether polyols include products obtained by condensing thiodiglycol either alone or with other glycols, alkylene oxides, dicarboxylic acids, formaldehyde, aminoalcohols or aminocarboxylic acids. Suitable polycarbonate polyols include products obtained by reacting diols such as 1,3-propanediol, 1,4-butanediol, 1,6-hexanediol, diethylene glycol or tetraethylene glycol with diaryl carbonates, e.g. diphenyl carbonate, or with phosgene. Suitable polyacetal polyols include those prepared by reacting glycols such as diethylene glycol, triethylene glycol or hexanediol with formaldehyde. Other suitable polyacetal polyols may also be prepared by polymerizing cyclic acetals. Suitable polyolefin polyols include hydroxy-terminated butadiene homo- and copolymers and suitable polysiloxane polyols include polydimethylsiloxane diols and triols.

Specific examples of suitable polyols are commercially available from BASF Corporation under the trademark of PLURACOL®. It is to be appreciated that the isocyanate-reactive component may include any combination of two or more of the aforementioned polyols.

In certain embodiments utilizing the polymer polyol, the polymer polyol is a graft polyol. Graft polyols may also be referred to as graft dispersion polyols or graft polymer polyols. Graft polyols often include products, i.e., polymeric particles, obtained by the in-situ polymerization of one or more vinyl monomers, e.g. styrene monomers and/or acrylonitrile monomers, and a macromer in a polyol, e.g. a polyether polyol. In one embodiment, the isocyanate-reactive component is a styrene-acrylonitrile (SAN) graft polyol.

In other embodiments, the polymer polyol is chosen from polyharnstoff (PHD) polyols, polyisocyanate polyaddition (PIPA) polyols, and combinations thereof. It is to be appreciated that the isocyanate-reactive component can include any combination of the aforementioned polymer polyols. PHD polyols are typically formed by in-situ reaction of a diisocyanate with a diamine in a polyol to give a stable dispersion of polyurea particles. PIPA polyols are similar to PHD polyols, except that the dispersion is typically formed by in-situ reaction of a diisocyanate with an alkanoamine instead of a diamine, to give a polyurethane dispersion in a polyol. The article is not limited to any particular method of making the polymer polyol.

If utilized, the polymer polyol can serve as a sizing agent substitute, e.g. a sizing wax or wax sizing agent substitute, specifically by imparting a certain degree of water repellency to the article, once formed. Paraffin, for example, is a common wax sizing agent for OSB and OSL applications. In certain embodiments, the article is substantially free of a wax component, such as paraffin. By "substantially free", it is meant that in these embodiments, the wax component is typically present in an amount no greater than about 5, no greater than about 2.5, no greater than about 1.5, or approaching or equaling 0, parts by weight, based on 100 parts by weight of the lignocellulosic pieces, or any subrange in between. In certain embodiments, the article is completely free of a wax component.

One method by which the polymer polyol can impart water repellency is by at least partially coating a surface of the lignocellulosic pieces, thus decreasing surface tension of the surface. Another method by which the polymer polyol imparts water repellency is that the polymer polyol at least partially fills capillaries within and between the lignocellulosic pieces, thus providing a barrier to capillary uptake of water. Further, it is believed that the polymer polyol reduces formation of micro- and/or nano-cracks from forming within the article, for example, within the adhesive, during or after cure to form the reaction product. Yet further, if such cracks are already present in the lignocellulosic pieces, the polymer polyol at least partially fills such cracks, as with description of the capillaries. It is believed that the blocking of water and filling of cracks reduces de-lamination and swelling problems when the article is exposed to moisture during use. It is further believed that such "filling" largely occurs due to the polymeric particles of the polymer polyol.

In various embodiments, the polymer polyol includes a continuous phase and a discontinuous phase. The continuous phase of the polymer polyol is not generally miscible with the isocyanate component, which provides for increased coverage of the polymeric particles with reactive groups, such as hydroxyl (OH) groups. Such reactive groups can further impart crosslinking in the article, once the reactive groups are reacted. The polymeric particles are further described below.

In certain embodiments, the polyol of the polymer polyol is a hydrophobic polyol. In a specific embodiment, the polyol is a hydrophobic polyether polyol. In another specific embodiment, the polyol is a hydrophobic polyester polyol. The hydrophobic polyol contains alkylene oxides. In these embodiments, the hydrophobic polyol typically has from about 0 to about 50, about 2 to about 20, or about 5 to about 15, parts by weight of ethylene oxide (EO), based on 100 parts by weight of the alkylene oxides of the hydrophobic polyol, or any subrange in between. In other embodiments, the hydrophobic polyol typically has at least 60, at least 70, or at least 80, parts by weight propylene oxide (PO), based on 100 parts by weight of the alkylene oxides, or any subrange in between. Accordingly, in these embodiments, the hydrophobic polyol is a propylene oxide rich polyol, which imparts the hydrophobic polyol with hydrophobicity, and therefore further imparts the article with hydrophobicity.

In certain embodiments, the alkylene oxides of the hydrophobic polyol include a mixture of EO and PO. In another embodiment, the alkylene oxides of the hydrophobic polyol include only PO, i.e., the hydrophobic polyol does not include other alkylene oxides, such as EO. In certain embodiments, the hydrophobic polyol includes other types of alkylene oxides known in the art, e.g. butylene oxide (BO), in combination with PO, and optionally, in combination with EO. The alkylene oxides of the hydrophobic polyol may be arranged in various configurations, such as a random (heteric) configuration, a block configuration, a capped configuration, or a combination thereof. For example, in one embodiment, the hydrophobic polyol includes a heteric mixture of EO and PO.

In certain embodiments, the hydrophobic polyol is terminally capped with EO. The hydrophobic polyol typically has a terminal cap of from about 5 to about 25, about 5 to about 20, or about 10 to about 15, parts by weight EO, based on 100 parts by weight of the hydrophobic polyol, or any subrange in between. In certain embodiments, the EO may only be present in the terminal ethylene oxide cap; however, in other embodiments, the EO may also be present along with the PO, and optionally, with other alkylene oxides, e.g. BO, in the alkylene oxides of the hydrophobic polyol. Generally, it is thought that increasing the PO content of the hydrophobic polyol is preferred in order to impart increased hydrophobicity to the article.

Suitable hydrophobic polyols include, but are not limited to, glycerine-initiated, trimethylolpropane-initiated, propylene glycol-initiated, and sucrose-initiated polyether polyols, and combinations thereof. In one embodiment, the hydrophobic polyol is a glycerine-initiated polyether polyol. The alkylene oxides of the hydrophobic polyol generally extend from the respective initiator portion of the hydrophobic polyol.

The discontinuous phase of the graft polyol includes polymeric particles. If micro- and/or nano-cracks are present in the lignocellulosic pieces, it is believed that the polymeric particles of the discontinuous phase of the polymer polyol at least partially fill these cracks. The polymeric particles are generally large in size due to their macromer constituents, i.e., the polymeric particles have micrometer or larger dimensions, e.g. micrometer or larger diameters. In certain embodiments, the polymeric particles have average diameters ranging from about 0.1 to about 10 microns, alternatively from about 0.1 to about 1.5 microns, or any subrange in between. In other embodiments, the polymeric particles have average diameters less than 0.1 microns, which imparts the polymer polyol with nano-polymeric particles. Blocking of water and filling of cracks reduces de-lamination and swelling problems when the article is exposed to moisture during storage or use. In addition to filling cracks, in certain embodiments, the polymeric particles are reactive with the isocyanate component, which may increase internal bond (IB) strength of the article. The polymeric particles typically include the reaction product of monomers chosen from styrenes, e.g. alpha-methyl styrene, acrylonitriles, esters of acrylic and methacrylic acids, ethylenically unsaturated nitriles, amines, amides, and combinations thereof. In certain embodiments, the polymeric particles include the further reaction of a macromer, such as a polyol having an unsaturation, which permits chemical incorporation of the polymeric particle. In these embodiments, it is believed that the polymeric particles can impart crosslinking in the article, due to reactive groups attached to the polymeric particles, e.g. OH groups, which can react with the isocyanate component. It is also believed that the polymeric particles can serve as a "hot melt" adhesive depending on their specific chemical makeup, e.g. polymeric particles formed from styrene and acrylonitrile monomers.

In one embodiment, the polymeric particles include styrene acrylonitrile (SAN) copolymers, which are the reaction product of styrene monomers and acrylonitrile monomers. Typically, the SAN copolymers have a weight ratio of styrene to acrylonitrile of from about 30:70 to about 70:30, about 40:60 to about 60:40, about 45:55 to about 60:40, about 50:50 to about 60:40, or about 55:45 to about 60:40, or any subrange in between. In one embodiment, the SAN copolymers have a weight ratio of styrene to acrylonitrile of about 66.7:33.3. In another embodiment, the polymeric particles are urea, which are the reaction product of an amine monomer and an isocyanate (NCO) group, such as an NCO group of a diisocyanate. In yet another embodiment, the polymeric particles are urethane, which are the reaction product of an alcohol monomer and an isocyanate (NCO) group, such as an NCO group of a diisocyanate.

Typically, the polymeric particles are present in the polymer polyol in an amount of from about 5 to about 70, about 15 to about 55, or about 25 to about 50, parts by weight, based on 100 parts by weight of the polymer polyol, or any subrange in between. In one embodiment, the polymeric particles are present in the polymer polyol in an amount of about 65 parts by weight based on 100 parts by weight of the graft polyol. Generally, increasing the amount of polymeric particles increases the water repellency of the article.

The polymer polyol typically has a molecular weight of from about 400 to about 20,000, about 500 to about 10,000, about 600 to about 5,000, or about 700 to about 3,000, or any subrange in between. In one embodiment, the polymer polyol has a molecular weight of about 730. In another embodiment, the polymer polyol has a molecular weight of about 3,000.

Other suitable polymer polyols and methods of making the same include those described in U.S. Pat. No. 4,522,976 to Grace et al.; U.S. Pat. No. 5,093,412 to Mente et al.; U.S. Pat. No. 5,179,131 to Wujcik et al.; U.S. Pat. No. 5,223,570 to Huang et al.; U.S. Pat. No. 5,594,066 to Heinemann et al.; U.S. Pat. No. 5,814,699 to Kratz et al.; U.S. Pat. No.

6,034,146 to Falke et al.; U.S. Pat. No. 6,103,140 to Falke et al.; U.S. Pat. No. 6,352,658 to Chang et al.; U.S. Pat. No. 6,432,543 to Harrison et al.; U.S. Pat. No. 6,472,447 to Lorenz et al.; U.S. Pat. No. 6,649,107 to Harrison et al.; and U.S. Pat. No. 7,179,882 to Adkins et al., the disclosures of which are incorporated herein by reference in various non-limiting embodiments.

Specific examples of suitable polymer polyols are commercially available from BASF Corporation, under the trademark PLURACOL®, such as PLURACOL® 1365, PLURACOL® 4600, PLURACOL® 4650, PLURACOL® 4800, PLURACOL® 4815, PLURACOL® 4830, and PLURACOL® 4850 graft polyols. In a specific embodiment, the isocyanate-reactive component includes PLURACOL® 4650. In another embodiment, the isocyanate-reactive component is PLURACOL® 2086 and/or PLURACOL® 593. The isocyanate-reactive component may include any combination of the aforementioned polymer polyols. Detailed information on polymer polyols is described on pages 104 and 105 of THE POLYURETHANES HANDBOOK (David Randall & Steve Lee eds., John Wiley & Sons, Ltd. 2002), which are incorporated herein in their entirety in various non-limiting embodiments.

If utilized, the polymer polyol typically has a viscosity which is suitable for specific applications of the polymer polyol to the lignocellulosic pieces, such as by spraying, fogging and/or atomizing the polymer polyol to apply the polymer polyol to the lignocellulosic pieces. Typically, the polymer polyol has a viscosity of from about 100 to about 10,000, about 500 to about 5,000, or about 500 to about 3,000, cps at 25° C. according to ASTM D2196, or any subrange in between. Regardless of application technique, the viscosity of the polymer polyol should be sufficient to adequately coat the lignocellulosic pieces.

If utilized, the polymer polyol is typically utilized in an amount of from about 5 to about 40, about 10 to about 30, or about 15 to about 25, parts by weight, based on 100 parts by weight of the adhesive system, or any subrange in between. The isocyanate-reactive component may include any combination of the aforementioned polyols, polymeric particles, and/or types of polymer polyols.

The adhesive system may further include an auxiliary polyol, different than the polyol in the polymer polyol, if the isocyanate component is utilized as the binder component. Suitable polyols for use as the auxiliary polyol are as described with the isocyanate-terminated prepolymer. The auxiliary polyol can be used for various purposes. For example, an auxiliary polyol having a higher functionality (relative to the polyol of the polymer polyol) can be utilized to provide additional reactive groups for reaction with the isocyanate component, or an auxiliary polyol can be utilized to increase or decrease viscosity of the adhesive system. The auxiliary polyol may be utilized in various amounts.

In a second embodiment of the binder component, the binder component of the adhesive system includes a UF resin, a phenol formaldehyde (PF) resin, or a melamine UF (MUF) resin, or a combination thereof. The PF resin may be any type in the art. Similarly, the UF resin may be any type of UF resin or melamine UF resin in the art. Suitable grades of UF resins and melamine UF resins are commercially available from a variety of suppliers, such as Hexion Specialty Chemicals Inc. of Springfield, Oreg. A specific example of a suitable UF resin is Casco-Resin F09RFP from Hexion.

In a third embodiment of the binder component, the binder component of the adhesive system is a soy-based adhesive. Soy-based adhesives typically include soy flour which may or may not be modified. The soy-based adhesive can be in the form of a dispersion. The soy can have various functional groups, such as lysine, histidine, arginine, tyrosine, tryptophan, serine, and/or cysteine. Each group, if present, can range from about 1% to about 8% by weight based on the soy itself. In certain embodiments, the soy flour may be copolymerized, such as with PF, UF, pMDI, etc. Suitable soy-based adhesives are described in: Wood adhesives 2005: Nov. 2-4, 2005 . . . San Diego, Calif., USA. Madison, Wis.: Forest Products Society, 2005: ISBN: 1892529459: pages 263-269; which is incorporated by reference in its entirety in various non-limiting embodiments.

In certain embodiments, the soy-based adhesive includes a combination of polyamidoamine-epi-chlorohydrin (PAE) resin and soy adhesive. The PAE resin and soy adhesive may be used in various ratios, typically with a greater amount of soy adhesive being present relative to the amount of PAE resin. Suitable grades of PAE and soy adhesives are commercially available from Hercules Incorporated of Wilmington, Del., such as Hercules® PTV D-41080 Resin (PAE) and PTV D-40999 Soy Adhesive. In one embodiment, the binder component includes a combination of the aforementioned PAE resin and soy adhesive.

Typically, such as in OSB, PB, scrimber, or MDF applications, the binder component is utilized in an amount of from about 1 to about 25, about 1 to about 20, about 1 to about 15, about 2 to about 10, about 5 to 15, about 5 to 10, or about 5 to 12, parts by weight, based on 100 parts by weight of the lignocellulosic pieces, or any subrange in between.

In certain embodiments, the isocyanate component is utilized in an amount of from about 1.4 to about 10.5, 2 to about 3, about 2.25 to about 2.75, or about 2.5, parts by weight, based on 100 parts by weight of the lignocellulosic pieces, or any subrange in between. In another embodiment, the UF, PF, and/or MUF resin is utilized in an amount of about 5 to about 10, about 5 to about 12, or about 5 to about 15, parts by weight based on 100 parts by weight of the lignocellulosic pieces, or any subrange in between. In another embodiment, the soy-based adhesive is utilized in an amount of about 7 to about 8 parts by weight based on 100 parts by weight of the lignocellulosic pieces, or any subrange in between. Generally, when too little of the binder component is utilized, the resulting article does not have the necessary physical properties to be commercially successful. Likewise, when too much of the binder component is utilized, cost of manufacturing the article generally increases beyond any imparted benefits of utilizing such amounts of the binder component.

The adhesive system may further include an additive component. If utilized, the additive component is typically chosen from parting agents, sizing agents, catalysts, fillers, flame retardants, plasticizers, stabilizers, cross-linking agents, chain-extending agents, chain-terminating agents, air releasing agents, wetting agents, surface modifiers, foam stabilizing agents, moisture scavengers, desiccants, viscosity reducers, reinforcing agents, dyes, pigments, colorants, anti-oxidants, compatibility agents, ultraviolet light stabilizers, thixotropic agents, anti-aging agents, lubricants, coupling agents, solvents, rheology promoters, adhesion promoters, thickeners, smoke suppressants, anti-static agents, anti-microbial agents, fungicides, insecticides, and combinations thereof. The additive component may be utilized in various amounts.

Other suitable additives include those described in U.S. Publication No. 2006/0065996 to Kruesemann et al., the disclosure of which is incorporated herein by reference in its entirety in various non-limiting embodiments. The additive component may include any combination of the aforementioned additives.

In certain embodiments, the additive component includes a catalyst component. In one embodiment, the catalyst component includes a tin catalyst. Suitable tin catalysts include tin(II) salts of organic carboxylic acids, e.g. tin(II) acetate, tin(II) octoate, tin(II) ethylhexanoate and tin(II) laurate. In one embodiment, the organometallic catalyst includes dibutyltin dilaurate, which is a dialkyltin(IV) salt of an organic carboxylic acid. Specific examples of suitable organometallic catalyst, e.g. dibutyltin dilaurates, are commercially available from Air Products and Chemicals, Inc. of Allentown, Pa., under the trademark DABCO®. The organometallic catalyst can also include other dialkyltin(IV) salts of organic carboxylic acids, such as dibutyltin diacetate, dibutyltin maleate and dioctyltin diacetate.

Examples of other suitable catalysts include iron(II) chloride; zinc chloride; lead octoate; tris(dialkylaminoalkyl)-s-hexahydrotriazines including tris(N,N-dimethylaminopropyl)-s-hexahydrotriazine; tetraalkylammonium hydroxides including tetramethylammonium hydroxide; alkali metal hydroxides including sodium hydroxide and potassium hydroxide; alkali metal alkoxides including sodium methoxide and potassium isopropoxide; and alkali metal salts of long-chain fatty acids having from 10 to 20 carbon atoms and/or lateral OH groups.

Further examples of other suitable catalysts, specifically trimerization catalysts, include N,N,N-dimethylaminopropylhexahydrotriazine, potassium, potassium acetate, N,N,N-trimethyl isopropyl amine/formate, and combinations thereof. A specific example of a suitable trimerization catalyst is commercially available from Air Products and Chemicals, Inc. under the trademark POLYCAT®.

Yet further examples of other suitable catalysts, specifically tertiary amine catalysts, include dimethylaminoethanol, dimethylaminoethoxyethanol, triethylamine, N,N,N',N'-tetramethylethylenediamine, N,N-dimethylaminopropylamine, N,N,N',N',N"-pentamethyldipropylenetriamine, tris(dimethylaminopropyl)amine, N,N-dimethylpiperazine, tetramethylimino-bis(propylamine), dimethylbenzylamine, trimethylamine, triethanolamine, N,N-diethyl ethanolamine, N-methylpyrrolidone, N-methylmorpholine, N-ethylmorpholine, bis(2-dimethylamino-ethyl)ether, N,N-dimethylcyclohexylamine (DMCHA), N,N,N',N',N"-pentamethyldiethylenetriamine, 1,2-dimethyl imidazole, 3-(dimethylamino)propylimidazole, and combinations thereof. Specific examples of suitable tertiary amine catalysts are commercially available from Air Products and Chemicals, Inc. under the trademark POLYCAT®. The catalyst component can be utilized in various amounts. The catalyst component may include any combination of the aforementioned catalysts.

In certain embodiments, the article is substantially free of UF resin and/or PF resin. By "substantially free", it is meant that in these embodiments, the UF resin and/or PF resin is present in an amount no greater than about 15, no greater than about 10, no greater than about 5, or approaching or equaling 0, parts by weight, based on 100 parts by weight of the article, or any subrange in between. In other embodiments, the article is completely free of UF resin and/or PF resin.

The adhesive system also includes the compatibilizer component, such that the article further includes the compatibilizer component disposed on the plurality of lignocellulosic pieces. By "disposed on", it is meant that the compatibilizer component is in contact with at least a portion of the lignocellulosic pieces. It is to be appreciated that various forms of the article can exist during manufacture, such as a wet/uncured state to a dry/cured state. The "wet" form of the article may also be referred to as a mass, furnish, or mat; whereas the "dry" form is generally the final form of the article, such as PB, OSB, etc. It is to be appreciated that the final form of the article may have some residual moisture content. The compatibilizer component is generally present during formation of the reaction product. The compatibilizer component may be applied onto the lignocellulosic pieces (e.g. by spraying) or may be combined with the lignocellulosic pieces (e.g. in a mixer) or both. Alternatively, the compatibilizer may be sprayed directly on a conveyor belt or other processing apparatus either in conjunction with, or separately from, application to, or mixture with, the lignocellulosic pieces.

The compatibilizer component includes or is a trialkyl phosphate (TAP). The triakyl phosphate may have the chemical formula $R_3PO_4$ wherein each R is independently an alkyl group having 1, 2, 3, 4, 5, or 6 carbon atoms. For example, the trialkyl phosphate may be trimethyl phosphate (TMP), triethyl phosphate (TEP), tripropyl phosphate (TPP), tributyl phosphate (TBP), tripentyl phosphate (TPP), trihexyl phosphate (THP), or combinations thereof. Each R group may have the same number of carbon atoms and may be the same as one another or may be isomers of one another. Alternatively one or more R groups may have a different number of carbon atoms from one another.

In certain embodiments, the compatibilizer component is TEP. TEP has the chemical formula $(C_2H_5)_3PO_4$ and may also be referred to as "phosphoric acid, triethyl ester". TEP is typically classified as a polar nonionic solvent.

In certain embodiments, it is believed that the TAP (such as TEP) acts as a phase transfer catalyst for the reactions of isocyanates (e.g. MDI, pMDI, etc.) with proton donating materials such as water, polyols and/or polyamines. The TAP can also act as a solvent between the components, e.g. isocyanates, water, and various polyols and/or polyamines that are soluble in the TAP. It is believed that the TAP allows the reaction to occur at a faster rate and at lower temperatures by removing or at least reducing phase barriers between normally immiscible liquid reactants. An example is in the reaction between water and MDI/pMDI to form polyurea linkages. Another example is the formation of polyurethane linkages, e.g. when one or more polyols are utilized. Such a reaction(s) can be the rate determining step for the formation of the article. As described further below, the inclusion of the TAP in the adhesive system also allows for shorter pressing times for the manufacture of the article by facilitating reaction of the components of the adhesive system. In certain embodiments utilizing the isocyanate-reactive component, e.g. the polyol, the TAP can be carried therein for ease of handling. The TAP could be included along with other components as well, or utilized separate from other components of the adhesive system. In embodiments utilizing highly viscous isocyanate resins (e.g. those that are thick, semisolid, or solid at room temperature), the TAP can be utilized to reduce viscosity, which eases handling, manufacture, etc. For example, the TAP can be blended with such resins to reduce/remove heating requirements, to reduce burden on pumping equipment, to promote faster application, to promote faster reaction, etc. It is also thought that the TAP can be useful for lowering the total amount of binder component required to form the article.

The compatibilizer may further include a carrier or solvent, e.g. water, in addition to the TAP. Such solvents can be used in various amounts. Typically, such as in OSB, PB, or fiberboard (e.g. MDF) applications, the compatibilizer component is utilized in an amount of at least about 0.5, 1, 1.5, 2, 2.5, 3, 3.5, 4, 4.5, 5, 5.5, 6, 6.5, or 7, about 5 to about 50, about 5 to about 10, about 5 to about 7, about 7 to about 10, about 8.5 to about 50, about 10 to about 45, about 10 to about 40, or about 10 to about 35, parts by weight, based on 100 parts by weight of said binder component, or any subrange in between. In specific embodiments, the compatibilizer is utilized in an amount of from about 20 to about 50, about 22.5 to about 47.5, or about 25 to about 45, parts by weight, based on 100 parts by weight of said binder component (e.g. MDI/pMDI), or any subrange in between.

Typically, the binder component and compatibilizer component are utilized in the article in a combined amount of from about 1 to about 25, about 1 to about 15, about 1 to about 10, or about 5 to about 10, parts by weight, based on 100 parts by weight of the lignocellulosic pieces, or any subrange in between. By "combined amount", it is meant that each of the binder component and the compatibilizer component are individually utilized in the article in a positive amount, i.e., in an amount greater than zero (0) parts by weight based 100 parts by weight of the lignocellulosic pieces. The binder component and compatibilizer component can be utilized in the article in various weight ratios. In various embodiments, this ratio is from 0.1:1 to 1:0.1. In another embodiment, this ratio is about 1:1. It is to be appreciated that the other optional components, e.g. the additive component, can also be utilized to form the article. In related embodiments, the adhesive system is utilized in an amount of from about 1 to about 15 parts, or about 1 to about 25 parts, by weight based on 100 parts by weight of said article, or any subrange in between.

In certain embodiments, the adhesive system includes MDI and the TAP. In further embodiments, the adhesive system consists essentially of MDI and the TAP. In yet further embodiments, the adhesive system consists of MDI and the TAP. In other related embodiments, the MDI is replaced in whole, or part, by pMDI. In these embodiments, water reacts with the MDI/pMDI form the reaction product. The water can be part of the pre-cured adhesive system in addition to the binder and compatibilizer components (i.e., water is purposefully added/utilized), and/or already present along with the lignocellulosic pieces (e.g. as moisture, it was previously sprayed on, etc.). In other related embodiments, the adhesive system further includes a polyol, e.g. a polymer polyol, in addition to the TAP and MDI/pMDI. Other components may also be present, such as the additive component. The TAP and the MDI/pMDI can be utilized in any weight ratio. In various embodiments, this ratio is from 0.1:1 to 1:0.1. In another embodiment, this ratio is about 1:1.

The binder component and the compatibilizer component may be supplied to consumers for use by various means, such as in railcars, tankers, large sized drums and containers or smaller sized drums, totes, and kits. For example, one drum can contain the binder component and another drum can contain the compatibilizer component. In general, providing the components to consumers separately reduces premature potential reaction of the components and provides for increased formulation flexibility for forming the adhesive. For example, a consumer can select a specific binder component and specific compatibilizer component, and amounts thereof, to prepare the article formed therefrom. If other components are utilized, such as the additive component, e.g. the catalyst component, such components can be provided separately or premixed with one of or more of the binder component or the compatibilizer component.

In certain embodiments, the article further includes polymeric particles. In these embodiments, the polymeric particles are generally co-mingled with the lignocellulosic pieces. The polymeric particles can be useful for reducing weight of the article. In these embodiments, the adhesive system is generally disposed on the lignocellulosic pieces and the polymeric particles for bonding the lignocellulosic pieces and the polymeric particles.

If utilized, the polymeric particles can be of various sizes, distributions, shapes, and forms. Typically, the polymeric particles are in the form of beads. In certain embodiments, the polymeric particles are expanded polystyrene beads; however, the polymeric particles can be formed from various thermoplastics and/or thermosets. Specific examples of suitable polymeric particles are commercially available from BASF Corporation under the trademark of STYROPOR®. Other examples of suitable polymeric particles are described in U.S. Pat. No. 8,304,069 to Schmidt et al., the disclosure of which is incorporated herein by reference in its entirety in various non-limiting embodiments.

If utilized, the polymeric particles can be utilized in an amount of from about 1 to about 30, about 1 to about 20, or about 1 to about 10, parts by weight, based on 100 parts by weight of the lignocellulosic pieces, or any subrange in between.

The article may be of various sizes, shapes, and thickness. For example, the article can be configured to mimic conventional composite articles, such as OSB, PB, scrimber, and MDF beams, boards, or panels. The article can also be of various complex shapes, such as moldings, fascias, furniture, etc. In certain embodiments, the article is fiberboard, e.g. MDF. In other embodiments, the article is OSB, scrimber, or OSL. In yet other embodiments, the article is PB. The article can include one or more layers. For example, if the article is OSB, the article can include one layer, e.g. a core layer, two layers, e.g. a core layer and a face/fascia layer, or three or more layers, e.g. a core layer and two fascia layers.

In certain embodiments, such as for OSB applications, the article has a first fascia layer including a first portion of the plurality of lignocellulosic pieces compressed together and substantially oriented in a first direction. The article further has a second fascia layer spaced from and parallel to the first fascia layer and including a second portion of the plurality of lignocellulosic pieces compressed together and substantially oriented in the first direction. The article yet further has a core layer disposed between the first and second fascia layers and including a remaining portion of the plurality of lignocellulosic pieces compressed together and substantially oriented in a second direction different than the first direction. In these embodiments, at least one of the portions of the plurality of lignocellulosic pieces is compressed together with the adhesive system. The fascia layers can also include the adhesive system in addition to, or alternate to, the core layer. In certain embodiments, the core layer includes the polymeric particles along with the lignocellulosic pieces. The layers can each includes different adhesive systems, depending on the specific components utilized in the respective adhesive systems of the layers. In certain embodiments, at least one of the layers, e.g. one or both of the fascia layers, can include PF resin. Each of the layers can be of various thicknesses, such as those encountered with conventional OSB layers. OSL typically has lignocellulosic pieces substantially orientated in only one direction. Other types of composite articles, e.g. wood composites, and their methods of manufacture, that can be formed, e.g. by utilizing the adhesive system, are described by pages 395 through 408 of THE POLYURETHANES HANDBOOK (David Randall & Steve Lee eds., John Wiley & Sons, Ltd. 2002), which is incorporated herein by reference in their entirety in various non-limiting embodiments.

The article has an original thickness, i.e., a thickness after manufacture, e.g. after pressing the mat to form the final, i.e., cured, article. Typically, due to the adhesive system, the article exhibits a swelling of less than about 10%, less than about 5%, or less than about 3%, based on a 24-hour cold-soak test according to ASTM D1037. The thickness can vary, but is typically of from about 0.25 to about 10, about 0.25 to about 5, or about 0.25 to about 1.5, inches, or any subrange in between. It is to be appreciated that describing thicknesses may not be suitable when describing complex shapes other than boards or panels. As such, the article can be of various dimensions based on final configuration of the article.

The article has an internal bond (IB) strength. Typically, the IB strength is greater than about 20, greater than about 30, greater than about 40, greater than about 50, greater than about 60, greater than about 70, greater than about 80, greater than about 90, or greater than about 100, pounds per square inch (psi), according to ASTM D1037. In certain embodiments, the article has an IB strength of from about 50 to about 500, about 100 to about 300, or about 150 to about 250, psi, according to ASTM D1037, or any subrange in between.

IB strength is a tensile property. Typically, in conventional articles, as IB strength increases, flexural properties such as modulus of elasticity (MOE) and modulus of rupture (MOR) change, specifically, MOE generally decreases as IB strength increases.

Typically, the article has a MOE greater than 75,000, greater than 95,000, greater than 100,000, or greater than 110,000, psi, according to ASTM D1037. Typically, the article has a MOR greater than 3,000, greater than 3,250, greater than 3,300, or greater than 3,500, psi, according to ASTM D1037.

Also disclosed is a method of forming the article. To form the article, the lignocellulosic pieces are generally provided. The lignocellulosic pieces can be derived from a variety of lignocellulosic sources, and can be formed from a variety of processes.

The binder component and the compatibilizer component, and typically other components, e.g. the isocyanate-reactive and/or additive component(s), (all of which are hereinafter referred to simply as "the components") are applied to the plurality of lignocellulosic pieces to form a mass. The components can be applied to the lignocellulosic pieces at the same time, or can be applied to the lignocellulosic pieces at different times. In one embodiment, the binder component is applied the lignocellulosic pieces prior to the compatibilizer component. In another embodiment, the binder component is applied to the lignocellulosic pieces after the compatibilizer component. In yet another embodiment, the binder component and the compatibilizer component are applied simultaneously to the lignocellulosic pieces. For example, the binder component can be applied to the lignocellulosic pieces, and then the compatibilizer component can be applied to the lignocellulosic pieces at some time later, or vice versa. Alternatively, the components can be applied at the same time, either separately, and/or premixed. In one embodiment, the components are blended to form the adhesive system, such that the adhesive system is applied to the lignocellulosic pieces. The components can be applied to the lignocellulosic pieces by various methods, such as by mixing, tumbling, rolling, spraying, sheeting, blow-line resination, blending (e.g. blow-line blending), etc. For example, the components and the lignocellulosic pieces can be mixed or milled together during the formation of the mass, also referred to as a binder-lignocellulosic mixture or "furnish", as further described below.

Typically, the components are applied to the lignocellulosic pieces by a spraying, an atomizing or a fogging process. The plurality of lignocellulosic pieces having the binder component and the compatibilizer component applied thereon are then disposed on a carrier, and generally form (or define) the mass. The mass can then be formed into mat, such as by dropping the mass onto a carrier, e.g. a conveyor belt, or, alternatively, the mat can be formed directly on the carrier, i.e., the binder-lignocellulosic mixture is formed directly on the carrier. In other words, the plurality of lignocellulosic pieces having the binder component and the compatibilizer component applied thereon can be arranged on the carrier to form the mass in various ways. The mass can then be fed to a former, which generally forms the mass into a mat having a predetermined width and a predetermined thickness with the plurality of lignocellulosic pieces loosely oriented on the carrier. The predetermined width and thickness of the mat are determined according to final widths and thicknesses desired for the article, as described further below. The mat can then be formed in various shapes, such as boards or panels, or formed into more complex shapes such as by molding or extruding the mat to form the article.

In certain embodiments, the components are sprayed, atomized, and/or fogged onto the lignocellulosic pieces while the lignocellulosic pieces are being agitated in suitable equipment. Spraying, atomizing and fogging can occur via use of nozzles, such as one nozzle for each individual component supplied thereto, or nozzles that have two or more components premixed and supplied thereto. Generally, at least one nozzle applies the binder component and at least one nozzle applies the compatibilizer component. To maximize coverage of the lignocellulosic pieces, the components are generally applied by spraying droplets or atomizing or fogging particles of the components onto the lignocellulosic pieces as the lignocellulosic pieces are being tumbled in a rotary blender or similar apparatus. As another example, the lignocellulosic pieces can be coated with the components in a rotary drum blender equipped with at least one, typically at least two or three spinning disk atomizers. Tumblers, drums, or rollers including baffles can also be used. It is believed that applying shear to the components is important, especially if such components have high viscosities. Shear force can be useful for obtaining proper distribution of the components with respect to the lignocellulosic pieces, and can be obtained by specific nozzle design to obtain proper atomization of the components. It is believed that the components should be mixed very well, be it before or after application to the lignocellulosic pieces. Of course complete coverage of the lignocellulosic pieces with the components is desirable to ensure proper bonding. Atomization is useful for maximizing distribution of the components onto the lignocellulosic pieces, based in part on droplet size distribution of the components. Typically, the components are not premixed prior to application, to prevent premature reaction. As such, the components are each individually applied onto the lignocellulosic pieces via one or more nozzles, typically, by one nozzle per component to prevent premature reaction and/or contamination.

Alternatively, the lignocellulosic pieces can be provided directly to the carrier, and the components can be applied to the lignocellulosic pieces, e.g. by spraying or sheeting, to form the mass. For example, the lignocellulosic pieces can be disposed on a conveyor belt or a plate, and then sprayed with the components to form the mass. Further, at least one of the components, e.g. the compatibilizer component, can already be present on the lignocellulosic pieces, such that the remaining component(s) of the adhesive system, e.g. the binder component, can then be applied to the lignocellulosic pieces and to the compatibilizer component to form the mass.

The amount of the components to be applied and mixed with the lignocellulosic pieces is dependant upon several variables including, the specific components utilized, the size, moisture content and type of lignocellulosic pieces used, the intended use of the article, and the desired properties of the article. The resulting mass is typically formed into a single or multi-layered mat that is compressed into, for example, OSB, PB, scrimber, MDF, or another article of the desired shape and dimensions. The mass can also be formed into more complex shapes, such as by molding or extruding the mass.

The mat can be formed in any suitable manner. For example, the mass can be deposited on a plate-like carriage carried on an endless belt or conveyor from one or more hoppers spaced above the belt. When a multi-layer mat is formed, a plurality of hoppers are used with each having a dispensing or forming head extending across the width of the carriage for successively depositing a separate layer of the mass/furnish as the carriage is moved between the forming heads. The mat thickness will vary depending upon such factors as the size and shape of the lignocellulosic pieces, the particular technique used in forming the mat, the desired thickness and density of the final article and the pressure used during the press cycle. The thickness of the mat is usually about 5 times to about 20 times a final thickness of the article. For example, for flakeboard or particleboard panels of 0.5 inch thickness and a final density of about 35 lbs/ft$^3$, the mat usually will originally be about 3 inches to about 6 inches thick. The width of the mat is usually substantially the same as a final width of the article; however, depending on configuration of the article, the final width may be a fraction of the thickness, similar to description of the thickness.

Typically, the lignocellulosic pieces are loosely oriented in the mass and mat. A carrier is provided, such as a conveyor belt or plate, and the mass and eventual mat is disposed on the carrier. The mass can either be formed directly on the carrier, and/or transferred to the carrier, after forming, e.g. in a tumbler. It is thought that the adhesive system substantially maintains orientation of the plurality of lignocellulosic pieces in the mass while on the carrier. For the adhesive system to maintain orientation of the lignocellulosic pieces there is no requirement that the orientation is maintained perfectly. For example, minor distortion may occur. In general, the adhesive system serves as a "tackifier" or as "sticky" glue, and can be used as a substitute or supplemental adhesive for UF resins and/or PF resins, as well as for other conventional adhesives. As such, the adhesive system has tack or cold-tack. Cold-tack can be determined in a variety of ways. For example, one can use a "slump" test, which employs a funnel packed full of the mass, the funnel is then tipped onto a surface and removed, such that the mass (in the shape of the funnel) remains on the surface. The funnel shaped mass can then be observed for changes in shape over time, such as changes in angle due to slumping/collapsing of the funnel shaped mass. Another example is referred to as a "snowball" test, where one can grab a handful of the mass, make a ball of the mass in hand, and toss the ball up and down to determine if the ball falls apart. Other suitable tests are described in ASTM D1037.

When the mass is formed into the mat, the adhesive system also substantially maintains the width and the thickness of the mat while the mat is on the carrier. As can be appreciated, when the carrier moves, such as by conveying, the adhesive system keeps the mat from falling apart due to vibrations. Vibrations can also occur, for example, if the carrier is a plate, and the plate is being moved to a press. Such vibrations can cause orientation problems with the lignocellulosic pieces, can cause reduced internal bond (IB) strength, and can cause other similar issues.

The article is typically formed from the mat by compressing the mat formed from the mass at an elevated temperature and under pressure. Typically, at least pressure is applied to the mat for an amount of time sufficient to form the article. Heat is also typically applied. Such conditions facilitate reaction of the adhesive system, specially, at least reaction of the binder component, to form the reaction product. By imparting tack, the adhesive system can reduce movement of the lignocellulosic pieces in the mat, such as by reducing a chance that the lignocellulosic pieces will blow apart when applying pressure to the mat. Specifically, speed of applying pressure to the mat to form the article can be increased relative to conventional pressing speed and/or pressures utilized to form conventional composite articles, which provides economic benefits, such as increased throughput, for manufacturers of the article. The same tack imparted by the adhesive system is useful during movement of the mat, such as when being conveyed.

Typically, heat is applied to the mat to facilitate cure of the adhesive system. Press temperatures, pressures and times vary widely depending upon the shape, thickness and the desired density of the article, the size and type of lignocellulosic pieces, e.g. wood flakes or sawdust, the moisture content of the lignocellulosic pieces, and the specific components utilized. The press temperature, for example, can range from about 100° C. to about 300° C. To minimize generation of internal steam and the reduction of the moisture content of the final composite article below a desired level, the press temperature is typically less than about 250° C. and most typically from about 180° C. to about 240° C., or any subrange in between. The pressure utilized is generally from about 300 to about 800 pounds per square inch (psi), or any subrange in between. Typically, the press time is from 120 to 900 seconds, or any subrange in between. The press time utilized should be of sufficient duration to at least substantially cure the adhesive (in order to substantially form the reaction product) and to provide a composite article of the desired shape, dimension and strength. For the manufacture of, e.g. flakeboard or PB panels, the press time depends primarily upon the panel thickness of the composite article produced. For example, the press time is generally from about 200 seconds to about 300 seconds for a composite article with about a 0.5 inch thickness. It is contemplated that pressure may be utilized without any external heat added in any of the aforementioned steps. Alternatively, external heat may be utilized without any external pressure used in any of the aforementioned steps. Moreover, both external heat and pressure may be applied in any of the aforementioned steps.

Other suitable methods for forming the article, are described in the U.S. Pat. No. 6,451,101 to Mente et al.; U.S. Pat. No. 6,458,238 to Mente et al.; U.S. Pat. No. 6,464,820 to Mente et al.; U.S. Pat. No. 6,638,459 to Mente et al.; U.S. Pat. No. 6,649,098 to Mente et al., U.S. Pat. No. 6,344,165 to Coleman; U.S. Pat. No. 7,439,280 to Lu et al.; and U.S.

Pat. No. 8,486,523 to Mente; and U.S. Publication No. 2005/0242459 to Savino et al., each of which is expressly incorporated herein in various non-limiting embodiments.

Without being bound or limited to any particular theory, it is thought that presence of the compatibilizer component reduces the amount of time required to form the article relative to the amount of time required when the compatibilizer component is not utilized to form the article. Specifically, it is thought that the compatibilizer component is useful for reducing cure time of the adhesive system during manufacture of the article. As such, throughput of the articles can be increased via increased manufacturing speeds, e.g. press speeds (i.e., shorter pressing times). Other manufacturing benefits can also be realized, such as improved application of the components of the adhesive system to the plurality of lignocellulosic pieces relative to conventional adhesives. In addition, it is believed that the articles include excellent physical properties. For example, in certain embodiments, the articles can have one or more of the following: increased bond strength, reduced edge swelling, improved release properties, improved flexural modulus, and/or reduced emissions, each relative to conventional articles. It is thought that other potential advantages afforded by the use of the compatibilizer component are: improved plasticization of the lignocellulosic pieces; reduced binder component viscosity leading to improved distribution on the lignocellulosic pieces; and improved flame test performance of the articles. It is thought that the compatibilizer component can also improve the performance of other, optional, components utilized to form the articles, such as polyols through phase transfer catalysis and/or viscosity reducing mechanisms.

In various embodiments, use of the compatibilizer component may increase processing speeds 1, 2, 3, 4, 5, 6, 7, 8, 9, 10, 15, 20, percent or more. The increase in processing speed may be achieved with minimal, if any, increase in destructive forces applied to the developing article during formation. Alternatively, use of the compatibilizer component may decrease the destructive forces applied to the developing article.

In other embodiments, the compatibilizer component may decrease the viscosity and/or surface tension of one or more release agents and/or soaps/detergents. This interaction is typically a physical interaction and not necessarily a chemical interaction. For example, the compatibilizer component may decrease the viscosity and/or surface tension of a silicone surfactant, including any of those described above. This decrease in surface tension may improve coverage of the release agents and/or soaps/detergents per unit weight. This decrease may be quantified via surface tension measurements made with a goniometer.

More specifically, contact angle data can be taken in a temperature controlled room maintained at 20° C. The goniometer can be the Kruss DSA Model 100 Drop Shape Analysis System. For example, 5 microliter droplets can be deposited on a clean substrate stage plate by the goniometers's automated dosing syringe. Measurements of the contact angle can then be automatically recorded approximately every tenth of a second up to 12 seconds (i.e., 120 tenths of seconds). The left and right contact angles can be recorded and averaged by the goniometer's software.

In various embodiments, release agent enhancement can be observed. The TAP may form a coating upon a metal belt or platen in a production line and may help the release agent and/or soap/detergents remain on the surface of the metal belt or platen. This may reduce destructive forces applied by press operation (and/or during exit of a continuous press) to an article. This effect may last for several minutes or hours even after cessation of application of the release agent and/or soap/detergents to the metal belt or platen, or even after general use of the release agent and/or soap/detergents in the article itself. In other words, even after the release agent and/or soap/detergents is no longer used in a process described herein or in the article described herein, the benefits may surprisingly remain. Referring back to the aforementioned increase in processing speed, this increase may be observed even after the removal of the TAP from the process. For example, even after a source of TAP is removed from the process of forming the article, the increase in processing speed may still be observed. Without intending to be bound by any particular theory, this may occur because some of the TAP may still be present on one or more pieces of the processing machinery or apparatus, e.g. a conveyor belt, platen, wheel, etc. This effect may be observed 1, 2, 3, 4, 5, 6, 7, 8 or more hours after the source of the TAP is removed.

The TAP may be added directly to the release agent and/or soap/detergent and may not be included in the article at all. Alternatively, the TAP may be added to both the release agent and/or soap/detergent and also be used in the article. Even further, the TAP may be used in the article and not added to the release agent and/or soap/detergent at all. The TAP may be utilized in any one or more portions or components of the article and/or in any one or more portions or steps of the process or method described herein.

It is also contemplated that the TAP may be added to the release agent (e.g. a silicone surfactant) and/or soap/detergent independently of any article and independently of any method or process used to form the article described herein. Said differently, this disclosure also provides an independent mixture of the TAP and the release agent and/or soap/detergent that is used for purposes not expressly described herein.

The following examples, illustrating the articles, are intended to illustrate and not to limit the disclosure.

EXAMPLES

Comparative articles (Example 1) and disclosure articles (Examples 2, 3, and 4) are prepared. The articles are particleboards. The articles are made using typical production methods for manufacturing particleboard (PB), such that method of manufacture does not impart differences between the articles. The amount and type of each component used to form furnishes of the articles are illustrated in Table I below.

TABLE I

| | Example No. | | | |
|---|---|---|---|---|
| Component | 1 | 2 | 3 | 4 |
| Lignocellulosic Pieces (g) | 32,659 | 32,659 | 32,659 | 32,659 |
| Lignocellulosic Pieces (wt. %) | 94.44 | 93.89 | 93.89 | 93.36 |
| Binder (g) | 824 | 824 | 824 | 824 |
| Binder (wt. %*) | 2.52 | 2.52 | 2.52 | 2.52 |
| Compatibilizer (g) | 0 | 200 | 200 | 400 |
| Compatibilizer (wt. %*) | 0.00 | 0.61 | 0.61 | 1.22 |
| Water (g) | 1100 | 1100 | 1100 | 1100 |
| Water (wt. %*) | 3.37 | 3.37 | 3.37 | 3.37 |
| Moisture Content (wt. %) | 9.03 & 8.21 | 8.38 | 8.43 | 9.20 |

*Each based on 100 parts by weight of the lignocellulosic pieces

The lignocellulosic pieces are of shape and size typically used to form PB. Specifically, the lignocellulosic pieces include pine having a dry weight content of about 88% and a moisture content of about 7%, by weight, passed on 100 parts by weight of the lignocellulosic pieces.

The binder is an isocyanate including MDI and pMDI (referred to simply as "MDI" below). The isocyanate has a functionality of about 2.7, NCO content of about 31.5 wt. %, and viscosity of about 200 cps at 25° C. The isocyanate is commercially available from BASF Corporation.

The compatibilizer used in Examples 1-4 is TEP. The compatibilizer utilized in Examples 2 and 4 is 100% TEP, the compatibilizer in Example 3 is a blend of 200 grams water and 200 grams TEP. These amounts are accounted for as total amounts in Table I above. TEP is commercially available from a variety of sources.

Each furnish is formed by spraying and blending the components in a blender. Order of addition to the blender is as follows: lignocellulosic pieces, water, binder, and compatibilizer. Example 3 utilizes a blend of water and TEP as the compatibilizer (such that these are pre-mixed prior to adding to the blender). The only difference between Example 2 and 3 is the order of addition of components, with Example 3 utilizing a pre-blend of a portion of the total amount water and an entirety of the total amount TEP. Each furnish is made at ambient temperature.

After formation, each furnish is split evenly into six masses (or mats) that weigh ~4,800 grams each. The mats are compressed using a standard PB forming apparatus under typical temperature and pressure conditions used in the art, thereby forming each of the respective articles. The articles (i.e., particleboards) are ~1" thick, ~20" wide, and ~20" long. Different press times are utilized to form each of the articles, as illustrated in Table II below. After the articles are formed, each article is visually inspected for delamination or other defects. Internal bond (IB) strength of the articles is determined according to ASTM D1037. Final moisture content of the articles is determined using a heat balance and is shown in Table I above.

To determine analyze IB strength, the particles boards are cut in half. Next, a 2" strip is cut from one of the halves. That strip is then cut into eight 2" strips which are tested for IB. It is thought that edge effects (e.g. squeeze out) resulting from lab scale board size plays a factor in the ultimate IB values of the strips. For example, two or three of the eight strips can have lower values than the remaining of the eight strips. It is believed that this is often caused by squeeze out at the edges.

TABLE II

| Press Time and Formulation Effects on IB (psi) of Single Layer Particle Board Panels | | | | |
|---|---|---|---|---|
| Press Time (sec) | MDI 2.5% | MDI 2.5%; TEP 0.6% (1) | MDI 2.5%; TEP 0.6% (2) | MDI 2.5%; TEP 1.2% |
| 270 | 103 | | | |
| 247 | 90 | | | |
| 243 | 109 | | | |
| 228 | 60 | 112 | 84 | 133 |
| 220 | 53 | | 75 | |
| 218 | | 79 | | |
| 215 | | 79 | 68 | 123 |
| 214 | 36 | | | |
| 213 | | 79, 59 (3) | | |
| 210 | | 43 | 53 | 116 |
| 200 | | | | 55 |
| 198 | | 36 | | |
| 195 | | | | 27 |
| 190 | | | | 28 |

(1) Added neat;
(2) mixed in water, overall moisture content unchanged;
(3) density variation.

While some of the articles show some marginal defects or delamination upon visual inspection, none of the disclosure articles have complete delamination (which would be represented, e.g., by a fissure all the way through the article). Overall, the disclosure articles require less press time than the comparative articles. Additional properties and results of the various articles can be appreciated with reference to FIGS. 1 through 5.

First Set of Additional Examples

A first set of additional examples models addition of a TAP and water solution (or mixture) to pMDI. The water and phosphate blend typically has to dissolve the pMDI to speed the reaction thereof.

More specifically, 1.5 grams of each of four TAPs was added to 20 grams of water in open beakers to form four independent mixtures. Trimethyl phosphate (TMP) and triethyl phosphate (TEP) dissolved completely. The tripropyl phosphate (TPP) partially dissolved while very little of the (TBP) dissolved. After stirring to maximize dissolution, 2.0 grams of pMDI (Lupranate M20FB) was added to each of the aforementioned mixtures.

None of the mixtures was clear. The tripropyl phosphate (TPP) formed solid pMDI urea most rapidly. The tributyl phosphate (TBP) blend was the second fastest, while the methyl and ethyl phosphates appeared to react similarly and were still liquid after 4 hours. Accordingly, this first set of additional examples demonstrates that TPP accelerates the water and pMDI reaction to a greater degree that the other TAPs.

Second Set of Additional Examples

A second set of additional examples models addition of pMDI as a separate stream to a wood furnish during blending.

More specifically, 1.5 grams of each of four TAPs was added to 5.0 grams of pMDI to form four independent mixtures. All the TAPs dissolved in the pMDI with a minimum of stirring. Then, 10 grams of distilled water were added to each of the mixtures and the mixtures were stirred for about 20 seconds.

None of the four mixtures was clear. The mixture including trimethyl phosphate (TMP) reacted the fastest. The remainder of the mixtures reacted in the following order relative to speed: triethyl phosphate (TEP), tripropyl phosphate (TPP), and tributyl phosphate (TBP).

The rate of reaction between the water and the pMDI may be determined by the solubility of one of the two reactants in the solution/blend of the compatibilizer and the remaining reactant. The presence of a TAP in either water or the isocyanate increased the reaction rate over a mixture of water and pMDI without catalyst.

Relative to the addition of the pMDI to the TAP, the tripropyl and tributyl phosphates were only partially soluble in water at the rates added. Regardless, each was a suitable solvent for pMDI such that urea formation occurred faster than in the mixtures wherein the trimethyl and triethyl phosphates are completely miscible.

Third Set of Additional Examples

A third set of additional examples demonstrates the effect of TEP on the surface tension of a silicone surfactant. More specifically, the surface tension of droplets of three samples was evaluated on stainless steel, steel, and aluminum surfaces.

The first sample is deionized water.

The second sample is a solution of 2% by weight in deionized water of Gorapur OS 1701W silicone surfactant that is commercially available from Evonik.

The third sample is a solution of 2% by weight of the aforementioned silicone surfactant and 2% by weight of TEP, in deionized water.

Figure 6A:
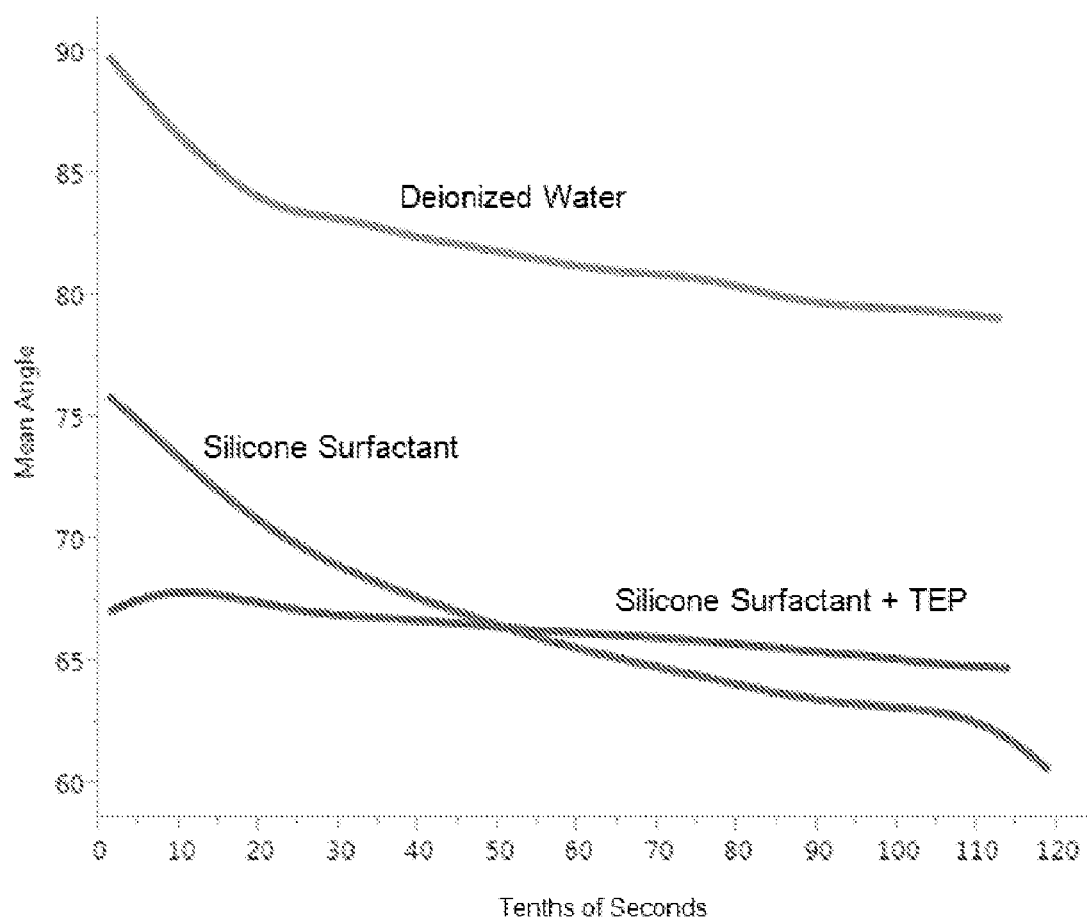
FIG. 6A is a line graph showing water contact angle of the first, second, and third samples on stainless steel measured in tenths of seconds.

Droplets of each sample were placed on the various surfaces and evaluated to determine water contact angle in one tenth of a second increments from 0 to 12 seconds (i.e., 120 tenths of seconds), pursuant to the method described above using the Kruss DSA Model 100 Drop Shape Analysis System. The results of these evaluations are set forth in FIG. 6A (stainless steel for first, second and third samples), 7A (steel for first, second and third samples), and 8A (aluminum for first, second and third samples).

Figure 6B:
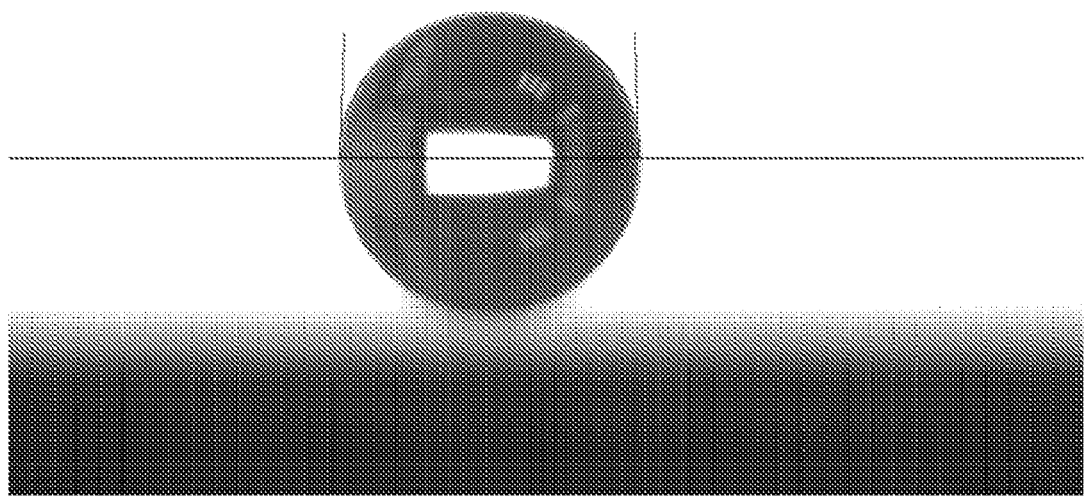
FIG. 6B is a photograph of a droplet of deionized water on stainless steel showing water contact angle.
Figure 6C:
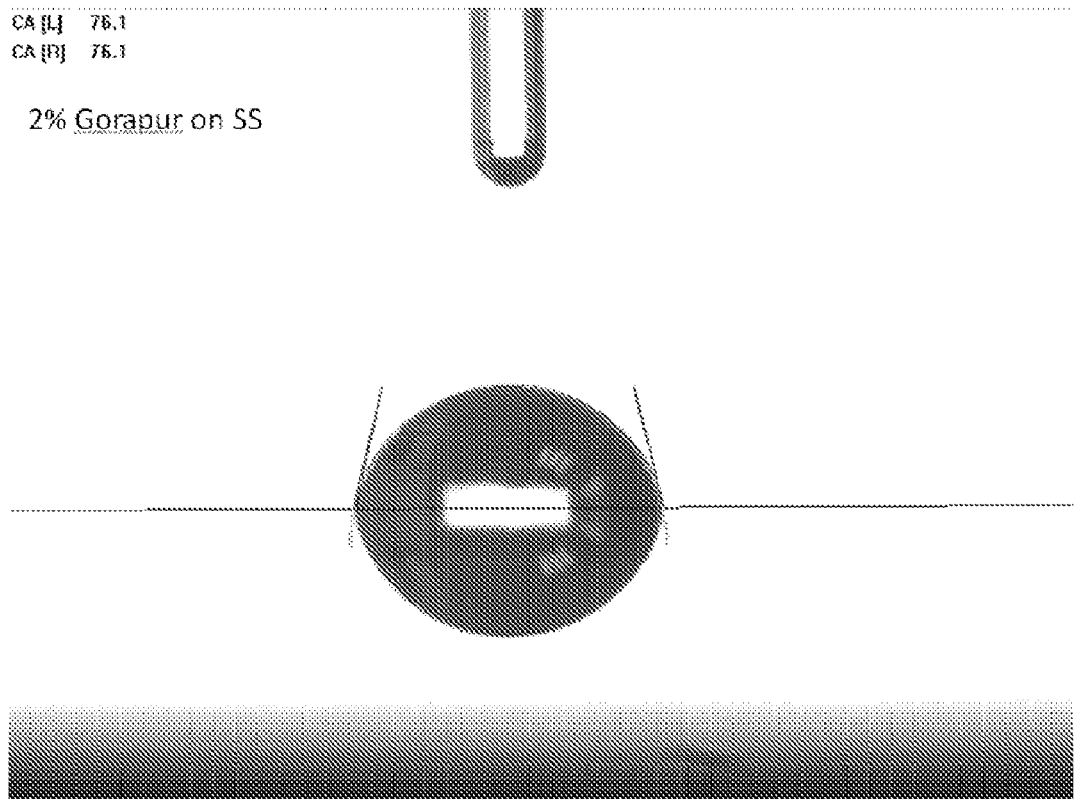
FIG. 6C is a photograph of a droplet of a mixture of deionized water and a silicone surfactant on stainless steel showing water contact angle.
Figure 6D:
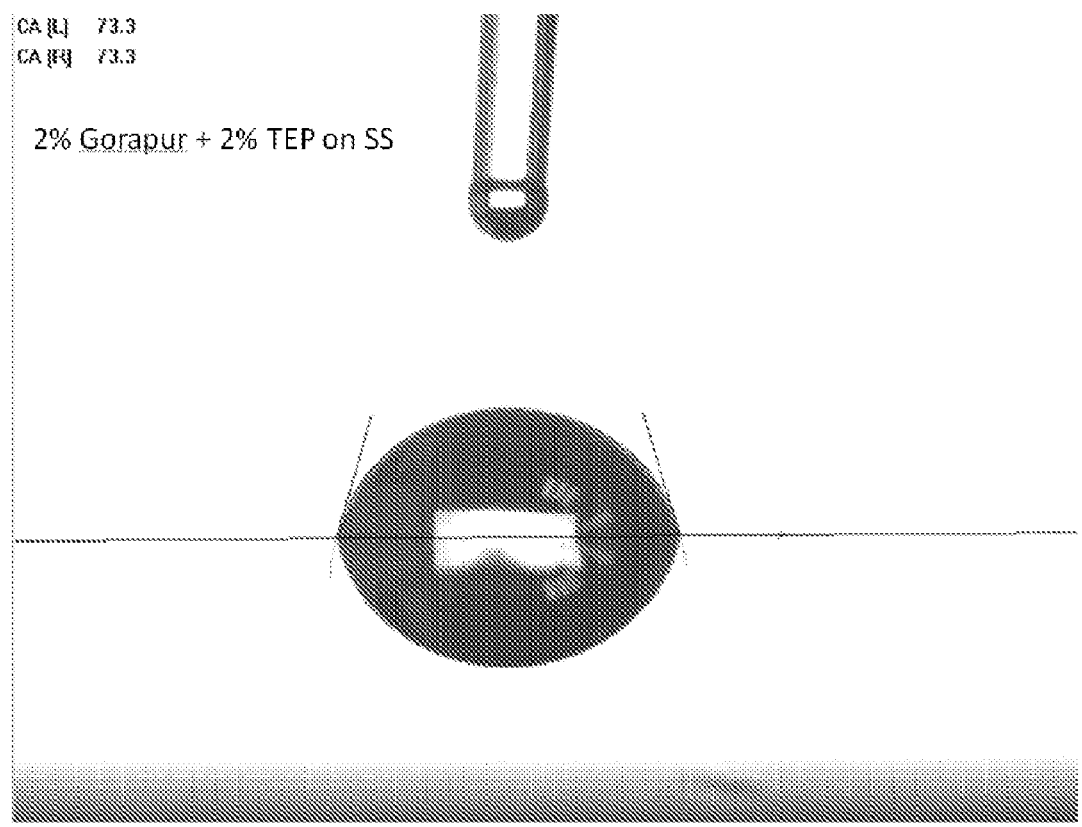
FIG. 6D is a photograph of a droplet of a mixture of deionized water, a silicone surfactant, and TEP, on stainless steel showing water contact angle.
Figure 7A:
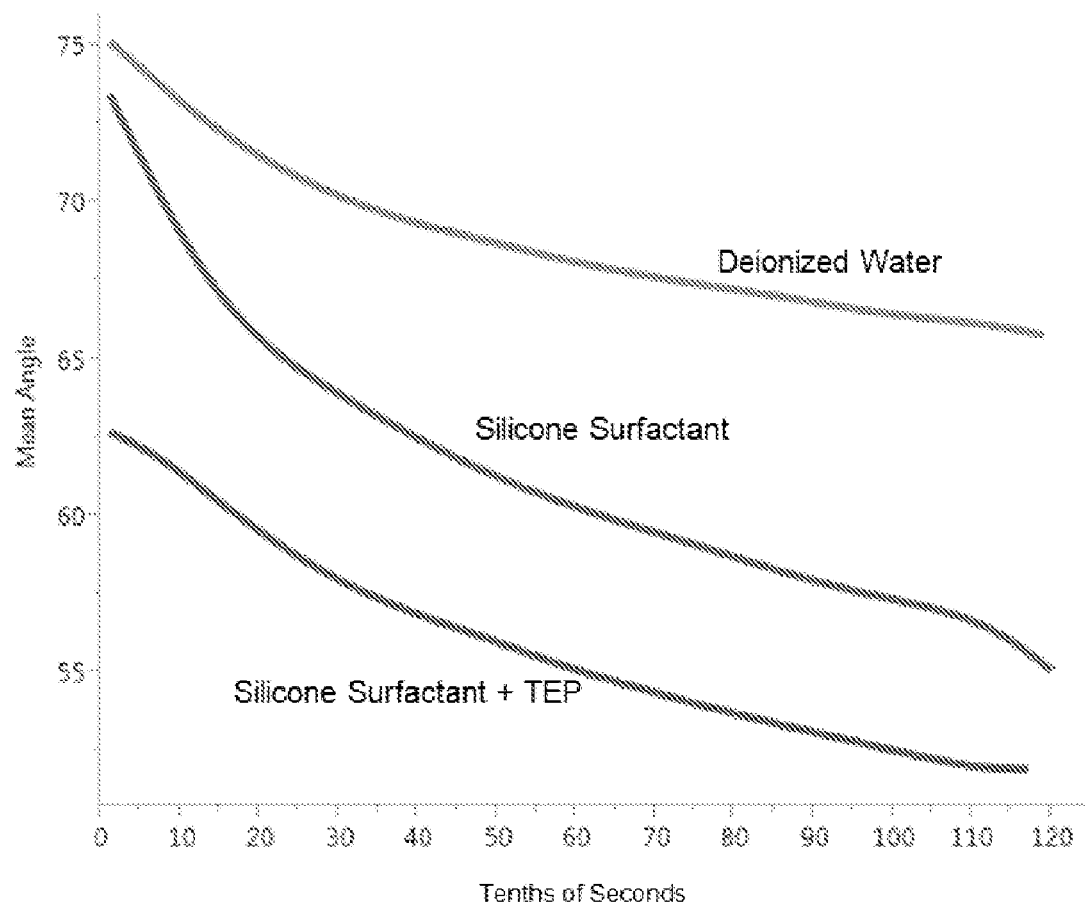
FIG. 7A is a line graph showing water contact angle of the first, second, and third samples on steel measured in tenths of seconds.
Figure 7B:
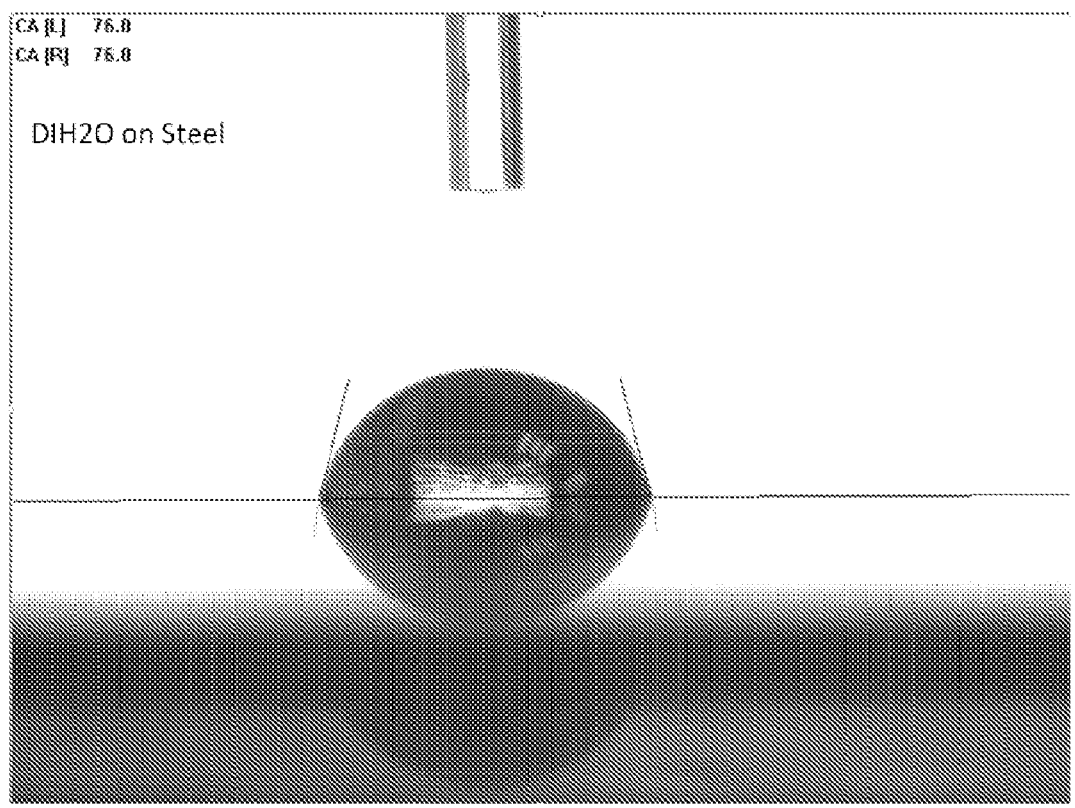
FIG. 7B is a photograph of a droplet of deionized water on steel showing water contact angle.
Figure 7C:
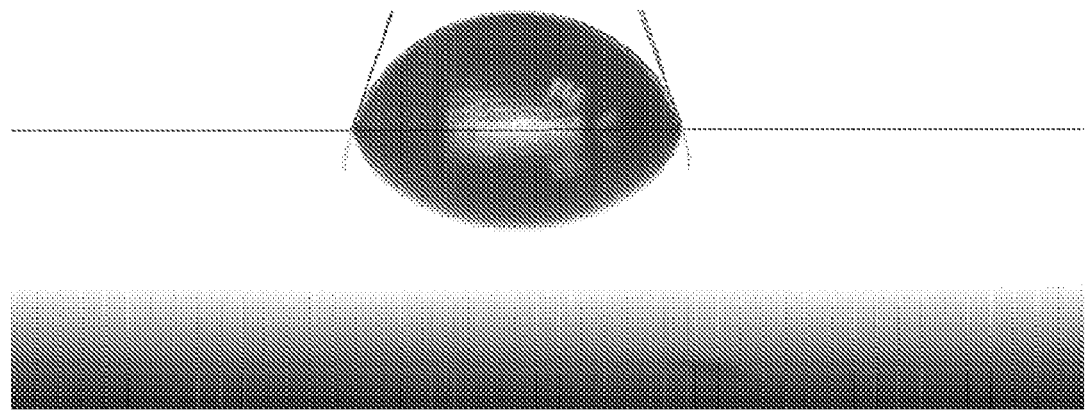
FIG. 7C is a photograph of a droplet of a mixture of deionized water and a silicone surfactant on steel showing water contact angle.
Figure 7D:
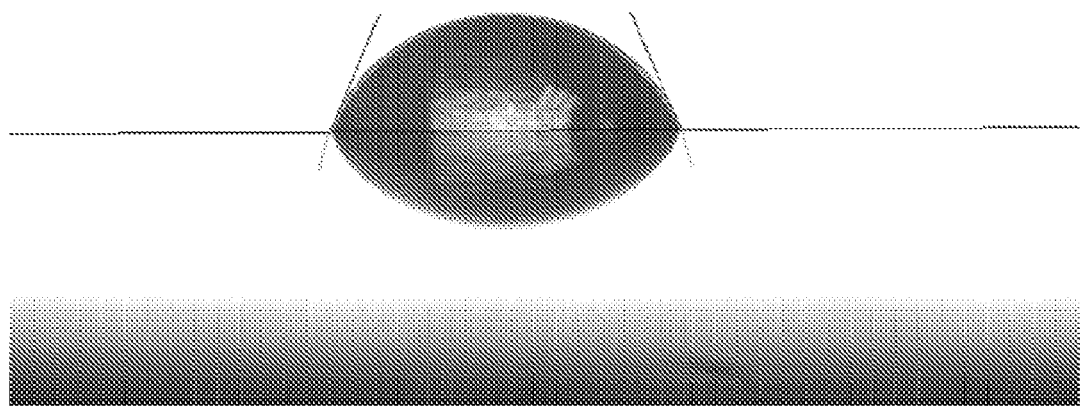
FIG. 7D is a photograph of a droplet of a mixture of deionized water, a silicone surfactant, and TEP, on steel showing water contact angle.
Figure 8A:
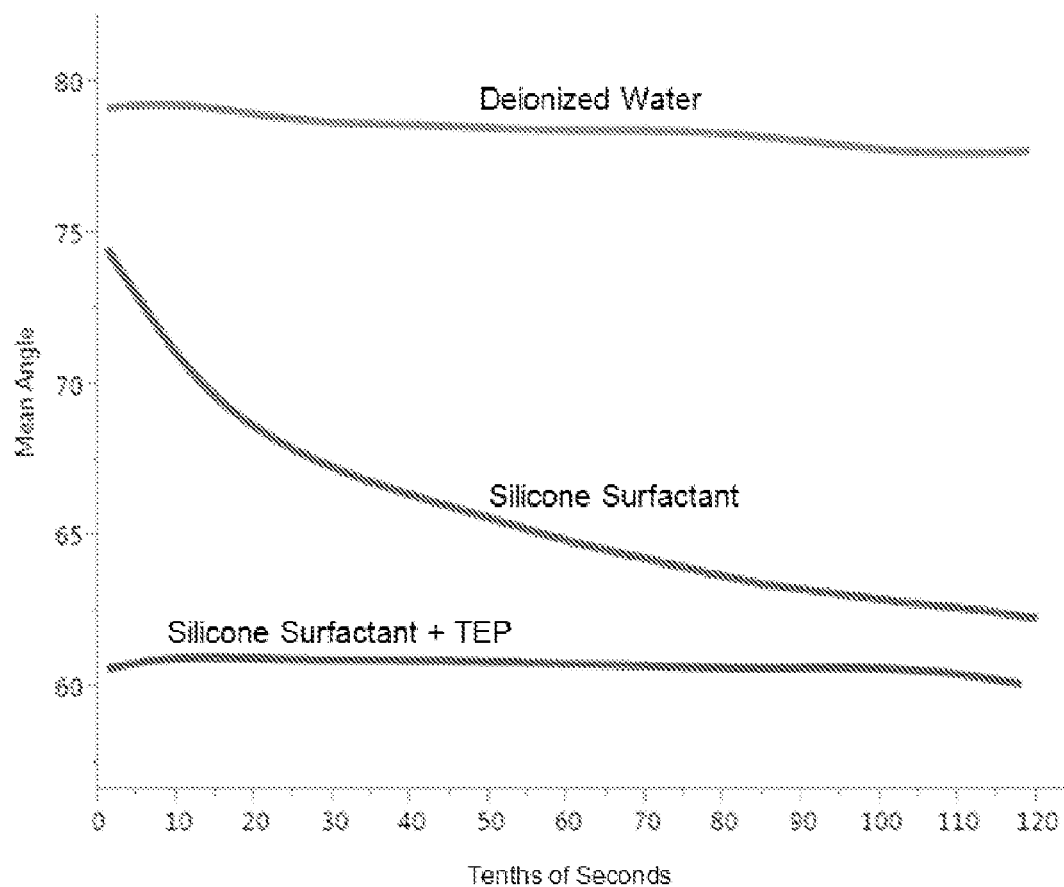
FIG. 8A is a line graph showing water contact angle of the first, second, and third samples on aluminum measured in tenths of seconds.
Figure 8B:
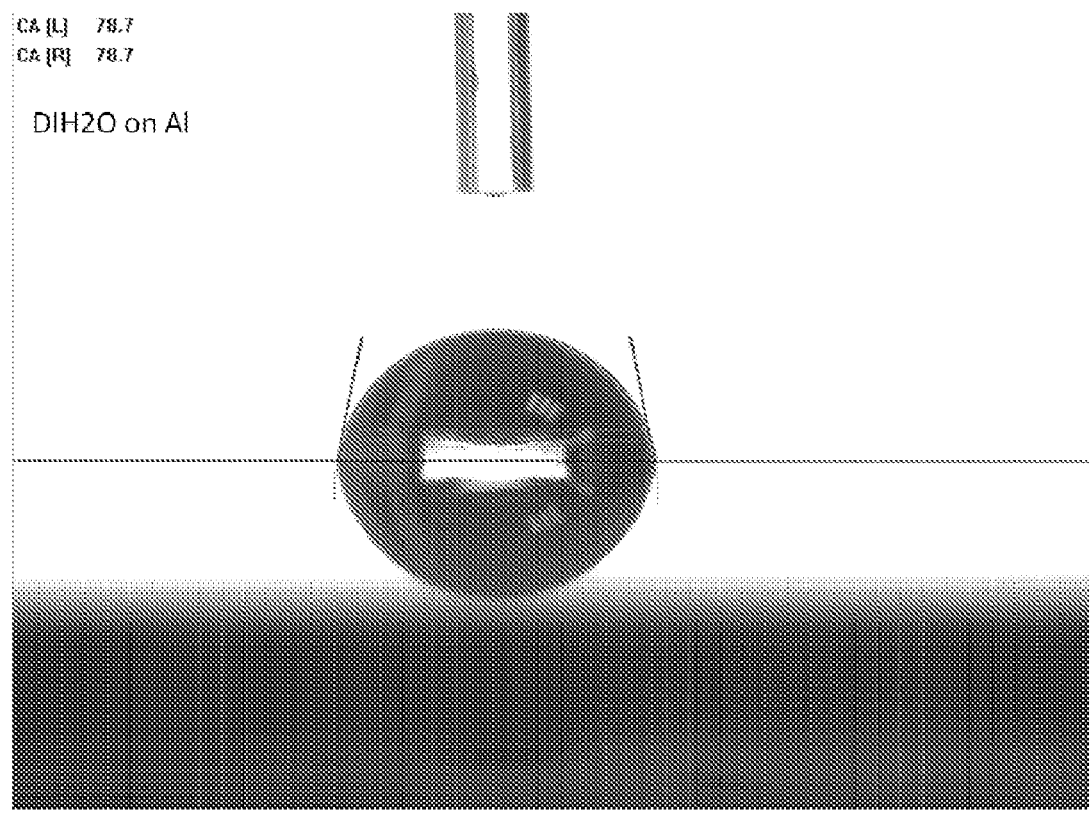
FIG. 8B is a photograph of a droplet of deionized water on aluminum showing water contact angle.
Figure 8C:
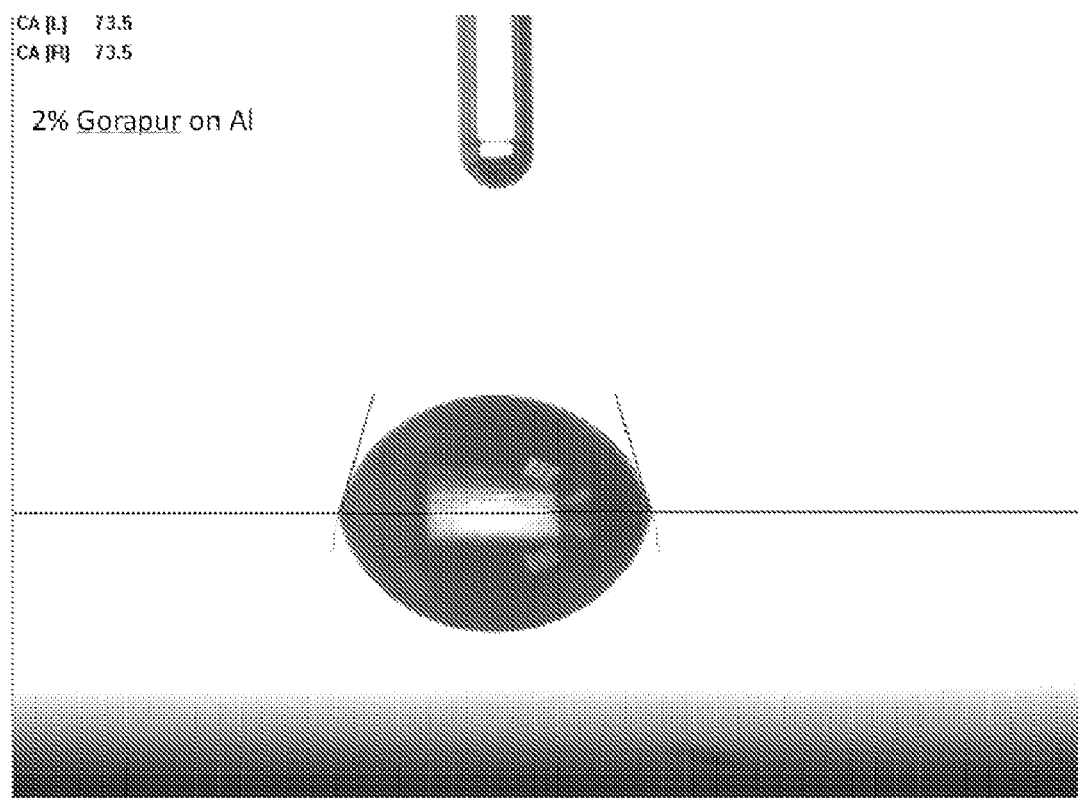
FIG. 8C is a photograph of a droplet of a mixture of deionized water and a silicone surfactant on aluminum showing water contact angle.
Figure 8D:
FIG. 8D is a photograph of a droplet of a mixture of deionized water, a silicone surfactant, and TEP, on aluminum showing water contact angle.
Figure 8D:
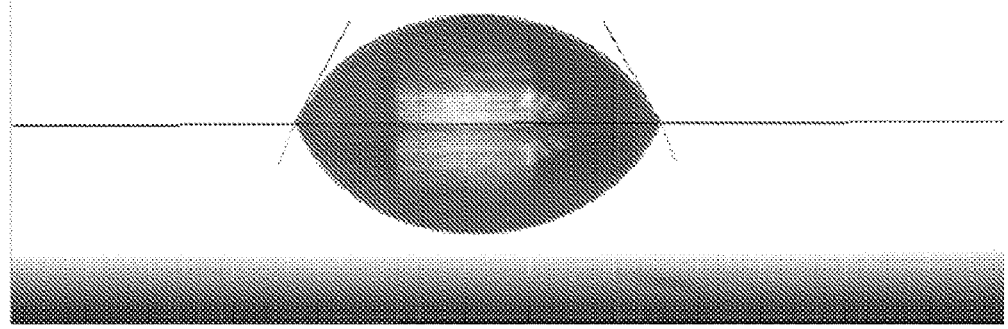

Moreover, photographs of various droplets for each sample are set forth as FIGS. 6B-6D (stainless steel for first, second and third samples), FIGS. 7B-7D (steel for first, second and third samples), and FIGS. 8B-8D (aluminum for first, second and third samples).

These evaluations clearly show that the inclusion of the TEP decreases the water contact angle of the droplets. The decreased contact angle of the droplet suggests that the droplets that include the TEP will exhibit better wetting on various surfaces which will reduce friction and destructive forces acting on the lignocellulosic composite article during formation, e.g. using the process or method described herein.

An increased pMDI/water reaction rate (e.g. increased panel production rate) was also discovered using a conventional single opening (batch process) laboratory press. The production speed increase attributable to synergy with the release agent was observed on a commercial trial on a continuous press when the speed increase continued for up to 6 hours after the TEP addition was stopped.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present disclosure independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present disclosure, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present disclosure has been described herein in an illustrative manner, and it is to be understood that the terminology which has been used is intended to be in the nature of words of description rather than of limitation. Many modifications and variations of the present disclosure are possible in light of the above teachings. The present disclosure may be practiced otherwise than as specifically described within the scope of the appended claims. The subject matter of all combinations of independent and dependent claims, both single and multiple dependent, is herein expressly contemplated.

What is claimed is:

1. A lignocellulosic composite article comprising:
   a plurality of lignocellulosic pieces derived from wood; and
   an adhesive system disposed on said plurality of lignocellulosic pieces for bonding said plurality of lignocellulosic pieces,
   wherein said adhesive system comprises:
   a binder component that is methylene diphenyl diisocyanate and/or polymeric methylene diphenyl diisocyanate and is present in an amount of from 2 to 10 parts by weight per 100 parts by weight of said lignocellulosic pieces,
   a trialkyl phosphate that is utilized in an amount of from 0.5 to 35 parts by weight based on 100 parts by weight of said binder component, and
   an isocyanate-reactive component wherein said isocyanate-reactive component comprises a polymer polyol having a continuous phase comprising a polyol and a discontinuous phase comprising polymeric particles.

2. The article of claim 1, wherein said compatibilizer component is chosen from trimethyl phosphate, triethyl phosphate, tripropyl phosphate, tributyl phosphate, and combinations thereof.

3. The article of claim 1, wherein said polymeric particles comprise styrene acrylonitrile (SAN) copolymers.

4. The article of claim 1, wherein said polymeric particles are present in said polymer polyol in an amount of from about 5 to about 70 parts by weight based on 100 parts by weight of said polymer polyol.

5. The article of claim 1, wherein said continuous phase comprises a hydrophobic polyol.

6. The article of claim 1, wherein said plurality of lignocellulosic pieces are utilized in an amount of from about 75 to about 99 parts by weight based on 100 parts by weight of said article.

7. The article of claim 1, wherein said adhesive system is utilized in an amount of from about 1 to about 25 parts by weight based on 100 parts by weight of said article.

8. The article of claim 1, wherein said article is:
(i) oriented strand board (OSB);
(ii) particleboard (PB); or
(iii) fiberboard.

* * * * *